(12) United States Patent
Barr

(10) Patent No.: US 11,365,537 B2
(45) Date of Patent: Jun. 21, 2022

(54) ADJUSTABLE FIXTURES FOR BURIED TUBULARS, FORMING TOOLS FOR DEFINING A HOLE IN THE ADJUSTABLE FIXTURES, AND METHODS OF MANUFACTURING THE ADJUSTABLE FIXTURES

(71) Applicant: Barrco, Inc., Camas, WA (US)

(72) Inventor: Aaron Barr, Camas, WA (US)

(73) Assignee: Barrco, Inc., Camas, WA (US)

( * ) Notice: Subject to any disclaimer, the term of this patent is extended or adjusted under 35 U.S.C. 154(b) by 65 days.

(21) Appl. No.: 16/795,292

(22) Filed: Feb. 19, 2020

(65) Prior Publication Data

US 2020/0277776 A1 Sep. 3, 2020

Related U.S. Application Data

(60) Provisional application No. 62/811,677, filed on Feb. 28, 2019, provisional application No. 62/852,902, filed on May 24, 2019.

(51) Int. Cl.
*B29C 45/14* (2006.01)
*E03F 3/06* (2006.01)
(Continued)

(52) U.S. Cl.
CPC .......... *E03F 3/06* (2013.01); *B29C 45/14065* (2013.01); *B66F 3/08* (2013.01); *E03F 5/04* (2013.01)

(58) Field of Classification Search
CPC ... B29C 45/14; B29C 45/14065; B29C 41/40; B29C 39/40; B29C 33/30; B29C 33/76
(Continued)

(56) References Cited

U.S. PATENT DOCUMENTS 2,234,784 A * 3/1941 Stolz .................. E04G 15/063
249/179
2,366,401 A 1/1945 Haskell
(Continued)

FOREIGN PATENT DOCUMENTS

CN 2883493 Y 3/2007
CN 201232201 Y 5/2009
(Continued)

OTHER PUBLICATIONS

English translation of German Patent Application Publication No. DE 102011007997 A1, Jul. 5, 2012.
(Continued)

*Primary Examiner* — Sunil Singh
(74) *Attorney, Agent, or Firm* — Dascenzo Gates Intellectual Property Law, P.C.

(57) ABSTRACT

Adjustable fixtures for buried tubulars, forming tools for defining a hole in the adjustable fixtures, and/or methods of manufacturing the adjustable fixtures. The adjustable fixtures include a fixture body and a plurality of spaced-apart holes extending between an upper surface of the fixture body and a lower surface of the fixture body. The adjustable fixtures also include a plurality of jack-screw-accepting threaded regions that at least partially defines the plurality of spaced-apart holes. The forming tools include a forming tool engagement structure, a threaded tool end region, and a hole-defining body. The methods include positioning a plurality of jack-screw-accepting threaded regions and a plurality of forming tools within a mold, filling a fixture-defining cavity of the mold with a composite material, curing the composite material, disengaging the plurality of forming tools from the plurality of jack-screw-accepting threaded regions, and removing the fixture body from the mold.

23 Claims, 11 Drawing Sheets

(51) Int. Cl.
*E03F 5/04* (2006.01)
*B66F 3/08* (2006.01)

(58) Field of Classification Search
USPC ............ 264/277, 278, 279, 261; 249/63, 64; 425/123
See application file for complete search history.

(56) References Cited

U.S. PATENT DOCUMENTS

| | | | |
|---|---|---|---|
| 2,930,295 | A | 3/1960 | Hale |
| 3,530,555 | A * | 9/1970 | Jorgensen, Jr. ............ B28B 1/24 425/84 |
| 3,571,867 | A | 3/1971 | Cooke |
| 3,695,153 | A | 10/1972 | Dorris |
| 3,764,066 | A | 10/1973 | Kowell |
| 3,769,190 | A | 10/1973 | Deem, Jr. |
| 3,930,739 | A | 1/1976 | Larsson et al. |
| 4,544,302 | A | 10/1985 | Farrelly |
| 4,618,464 | A | 10/1986 | Ditcher |
| 4,674,257 | A * | 6/1987 | Rose ................. B05C 17/00516 144/344 |
| 4,913,582 | A | 4/1990 | Barrett |
| 5,211,504 | A | 5/1993 | Trudel |
| 5,628,152 | A | 5/1997 | Bowman |
| 6,179,518 | B1 | 1/2001 | Suatac |
| 6,224,292 | B1 | 5/2001 | Akalin |
| 6,311,433 | B1 | 11/2001 | Zdroik |
| 6,350,093 | B1 | 2/2002 | Petersen et al. |
| 6,371,687 | B1 | 4/2002 | Heintz et al. |
| 6,811,350 | B2 | 11/2004 | Nadasde |
| 6,953,302 | B1 | 10/2005 | Kochling |
| 7,160,050 | B2 | 1/2007 | Meyers |
| 2009/0241435 | A1 | 10/2009 | Suatac |
| 2013/0326967 | A1 * | 12/2013 | Kim .......................... E04C 1/00 52/125.4 |

FOREIGN PATENT DOCUMENTS

| | | |
|---|---|---|
| CN | 202899167 U | 4/2013 |
| DE | 102011007997 A1 | 7/2012 |
| FR | 2900995 A1 | 5/2006 |
| JP | H 0549888 U | 7/1993 |
| JP | H 0581387 U | 11/1993 |
| JP | H 0643047 U | 6/1994 |
| JP | H 1161964 A | 3/1999 |
| JP | 2002294853 A | 10/2002 |
| JP | 2006274652 A | 10/2006 |
| JP | 4315843 B2 | 5/2009 |
| JP | 2010222895 A | 10/2010 |
| KR | 10-20160093956 A | 8/2016 |
| KR | 10-2019-0009952 * | 1/2019 |
| WO | WO 2016022316 A1 | 2/2016 |

OTHER PUBLICATIONS

English-language machine translation of French Patent Application Publication No. FR 2900995 A1, May 15, 2006.
Mirae Industry height adjustable basin product: www.ebay.com/itm/MIRAE-INDUSTRY-Height-adjustable-catch-basin-M-44, available at least as early as Jun. 21, 2018.
English-language machine translation of abstract of Chinese Patent No. CN 2883493 Y, Mar. 28, 2007.
English-language machine translation of abstract of Chinese Patent No. CN 201232201 Y, May 6, 2009.
English-language machine translation of abstract of Chinese Patent Application Publication No. CN 202899167 U, Apr. 24, 2013.
English-language machine translation of abstract of Japanese Patent No. JP 4315843 B2, May 29, 2009.
English-language machine translation of abstract of Japanese Patent Application Publication No. JP 2002294853 A, Oct. 9, 2002.
English-language machine translation of abstract of Japanese Patent Application Publication No. JP 2006274652 A, Oct. 12, 2006.
English-language machine translation of abstract of Japanese Patent Application Publication No. JP 2010222895 A, Oct. 7, 2010.
English-language machine translation of description of Japanese Patent Application Publication No. JPH 0549888 U, Jul. 2, 1993.
English-language machine translation of description of Japanese Patent Application Publication No. JPH 0581387 U, Nov. 3, 1993.
English-language machine translation of description of Japanese Patent Application Publication No. JPH 0643047 U, Jun. 7, 1994.
English-language machine translation of abstract of Japanese Patent Application Publication No. JPH 1161964 A, Mar. 5, 1999.
English-language machine translation of abstract of Korean Patent Application Publication No. KR 10-20160093956 A, Aug. 9, 2016.

* cited by examiner

ADJUSTABLE FIXTURES FOR BURIED TUBULARS, FORMING TOOLS FOR DEFINING A HOLE IN THE ADJUSTABLE FIXTURES, AND METHODS OF MANUFACTURING THE ADJUSTABLE FIXTURES

RELATED APPLICATIONS

This application claims priority to U.S. Provisional Patent Application No. 62/811,677, which was filed on Feb. 28, 2019, and to U.S. Provisional Patent Application No. 62/852,902, which was filed on May 24, 2019, the complete disclosures of which are hereby incorporated by reference.

FIELD OF THE DISCLOSURE

The present disclosure relates generally to adjustable fixtures for buried tubulars, forming tools for defining a hole in the adjustable fixtures, adjustment tools for adjusting the adjustable fixtures, and/or methods of manufacturing the adjustable fixtures.

BACKGROUND OF THE DISCLOSURE

Buried tubulars may be utilized to define storm drain systems, sewer systems, utility passageways, and/or other underground infrastructure within a subsurface region. Generally, the buried tubulars are installed via excavation and/or trenching and subsequent backfill. However, in some examples, the buried tubulars may be installed via subsurface drilling and/or boring. A fixture, such as a catch basin frame and/or a manhole cover frame, may be installed at an interface between the buried tubulars and a surface region. Such fixtures may be utilized to limit access to the buried tubulars and/or to permit stormwater to enter the buried tubulars. As an example, a storm grate may be installed within the catch basin frame to permit and/or facilitate the flow of storm water into a stormwater system while, at the same time, restricting the flow of debris and/or entry of unauthorized personnel into the stormwater system. As another example, a manhole cover may be installed within a manhole cover frame to limit access to the buried tubular.

During construction of the underground infrastructure, fixtures may be positioned, or set, and connected to the buried tubulars. The ground level then may be brought up to an initial grade, and a portion of the fixtures may extend above the initial grade. Subsequently, often many months later, the ground level may be brought up to a final grade, and the original positioning of the fixtures may be such that a top surface of the fixtures is level with the final grade.

In practice, a variety of factors may influence the accuracy with which the top surface of the fixtures matches the final grade. As an example, the initial positioning of the fixtures may be incorrect. As another example, the fixtures may be impacted and/or otherwise shifted via contact with surface equipment, such as construction machinery, prior to the ground level being brought up to final grade. As yet another example, soil compaction or displacement may cause the fixtures to settle, thus moving them from their original position.

Because of these and other factors, it is common to adjust the position of the fixtures prior to establishing the final grade. Historically, this adjustment has been accomplished by lifting, lowering, and/or rotating the entire fixture. If the adjustments are significant, it may be necessary to dig up an entirety of the fixture and/or to reposition the buried tubular that is connected to the fixture. While this approach is effective, it also is extremely time-consuming and expensive. Thus, there exists a need for adjustable fixtures for buried tubulars, for forming tools for defining a hole in the adjustable fixtures, for adjustment tools for adjusting the adjustable fixtures, and/or for methods of manufacturing the adjustable fixtures.

SUMMARY OF THE DISCLOSURE

Adjustable fixtures for buried tubulars, forming tools for defining a hole in the adjustable fixtures, and methods of manufacturing the adjustable fixtures are disclosed herein. The adjustable fixtures include a fixture body having an upper surface and a lower surface. The adjustable fixture also may include a central opening that may extend between the upper surface and the lower surface and/or may be sized to provide access to a buried tubular conduit that may be defined by the buried tubular. The adjustable fixtures also include a plurality of spaced-apart holes that may extend between the upper surface and the lower surface. The adjustable fixtures also include a plurality of jack-screw-accepting threaded regions, and each hole of the plurality of holes may be at least partially defined by a corresponding jack-screw-accepting threaded region of the plurality of jack-screw-accepting threaded regions. Each hole also may define a tapered hole region that may extend at least partially between the upper surface and the corresponding jack-screw-accepting threaded region.

The forming tools include a forming tool engagement structure and a threaded tool end region that may extend away from the forming tool engagement structure. The forming tools also include a hole-defining body. The hole-defining body may extend at least partially between the forming tool engagement structure and the threaded tool end region and/or may define a tapered body region that extends at least partially between the forming tool engagement structure and the threaded tool end region.

The methods include positioning a plurality of jack-screw-accepting threaded regions within a mold for the adjustable fixture and positioning a plurality of forming tools within the mold. The plurality of forming tools may be positioned such that a corresponding forming tool of the plurality of forming tools extends from each jack-screw-accepting threaded region of the plurality of jack-screw-accepting threaded regions. The methods also include filling a fixture-defining cavity of the mold with a composite material. The filling may include partially encapsulating a hole-defining body of each forming tool of the plurality of forming tools with the composite material. The methods further include curing the composite material, such as to define a fixture body of the adjustable fixture. The methods also include disengaging the plurality of forming tools from the plurality of jack-screw-accepting threaded regions and removing the fixture body from the mold.

DETAILED DESCRIPTION AND BEST MODE OF THE DISCLOSURE

Figure 1:
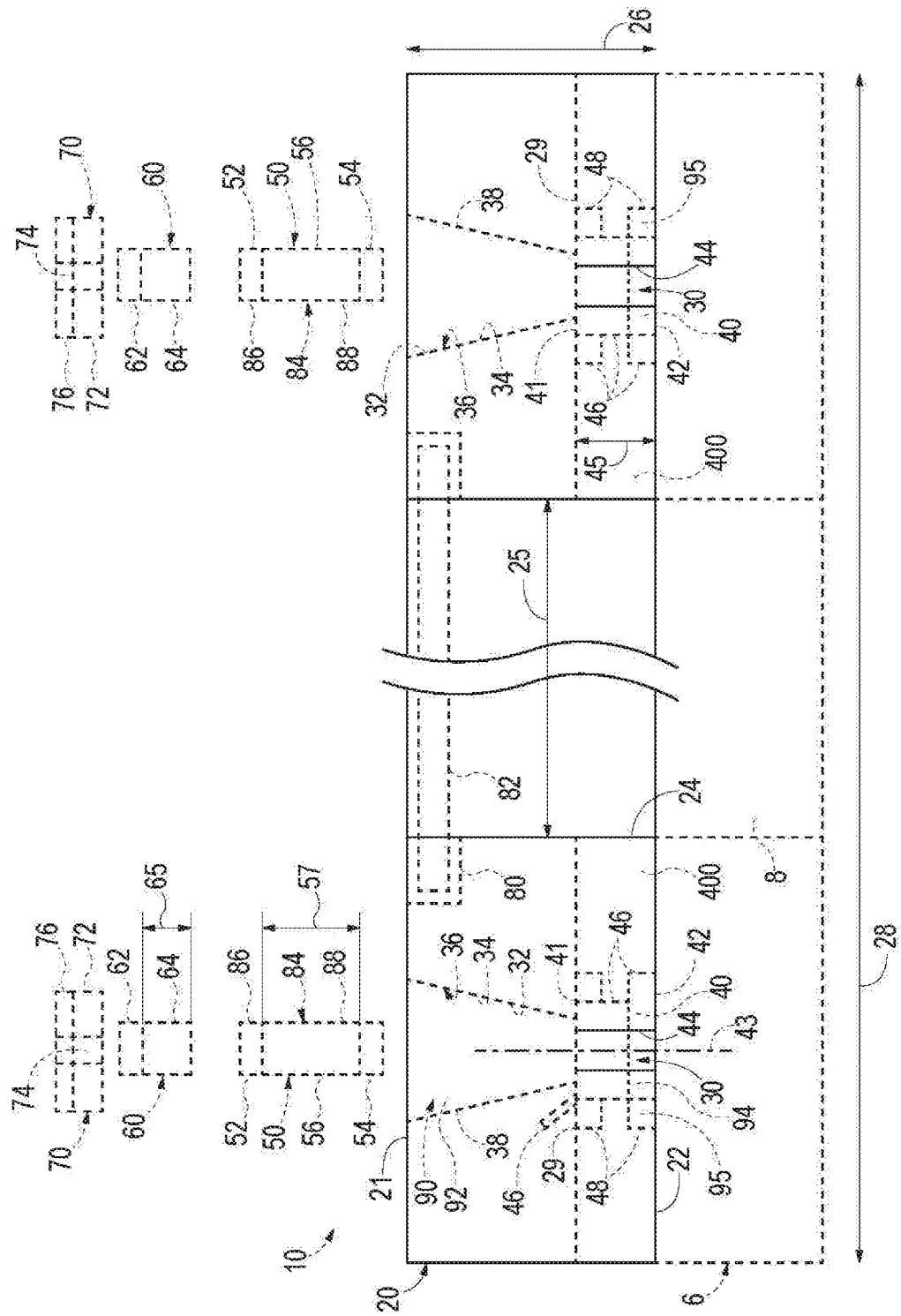
FIG. 1 is a schematic illustration of examples of an adjustable fixture for a buried tubular, according to the present disclosure.

FIGS. 1-18 provide examples of adjustable fixtures 10 for buried tubulars 6, of forming tools 100 for defining a hole in the adjustable fixtures, of adjustment tools 200 for adjusting the adjustable fixtures, and/or to methods 300 of manufacturing the adjustable fixtures, according to the present disclosure. Elements that serve a similar, or at least substantially similar, purpose are labeled with like numbers in each of FIGS. 1-18, and these elements may not be discussed in detail herein with reference to each of FIGS. 1-18. Similarly, all elements may not be labeled in each of FIGS. 1-18, but reference numerals associated therewith may be utilized herein for consistency. Elements, components, and/or features that are discussed herein with reference to one or more of FIGS. 1-18 may be included in and/or utilized with any of FIGS. 1-18 without departing from the scope of the present disclosure.

In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Adjustable fixtures 10, or fixtures 10, may include and/or be any top, terminal, terminating, and/or ground-level end of any suitable buried tubular 6. Examples of buried tubulars 6 include buried tubulars that may be utilized in stormwater systems, in sewer systems, and/or in buried utility systems. Examples of adjustable fixtures 10 include a cover, top, upper termination, roadway appurtenance, greenway appurtenance, drainage structure, catch basin cover frame, catch basin frame, curb inlet catch basin frame, access structure, manhole cover, manhole cover frame, riser ring, combination inlet, access cover, utility vault lid, vent grate, grating, and/or construction casting.

Figure 2:
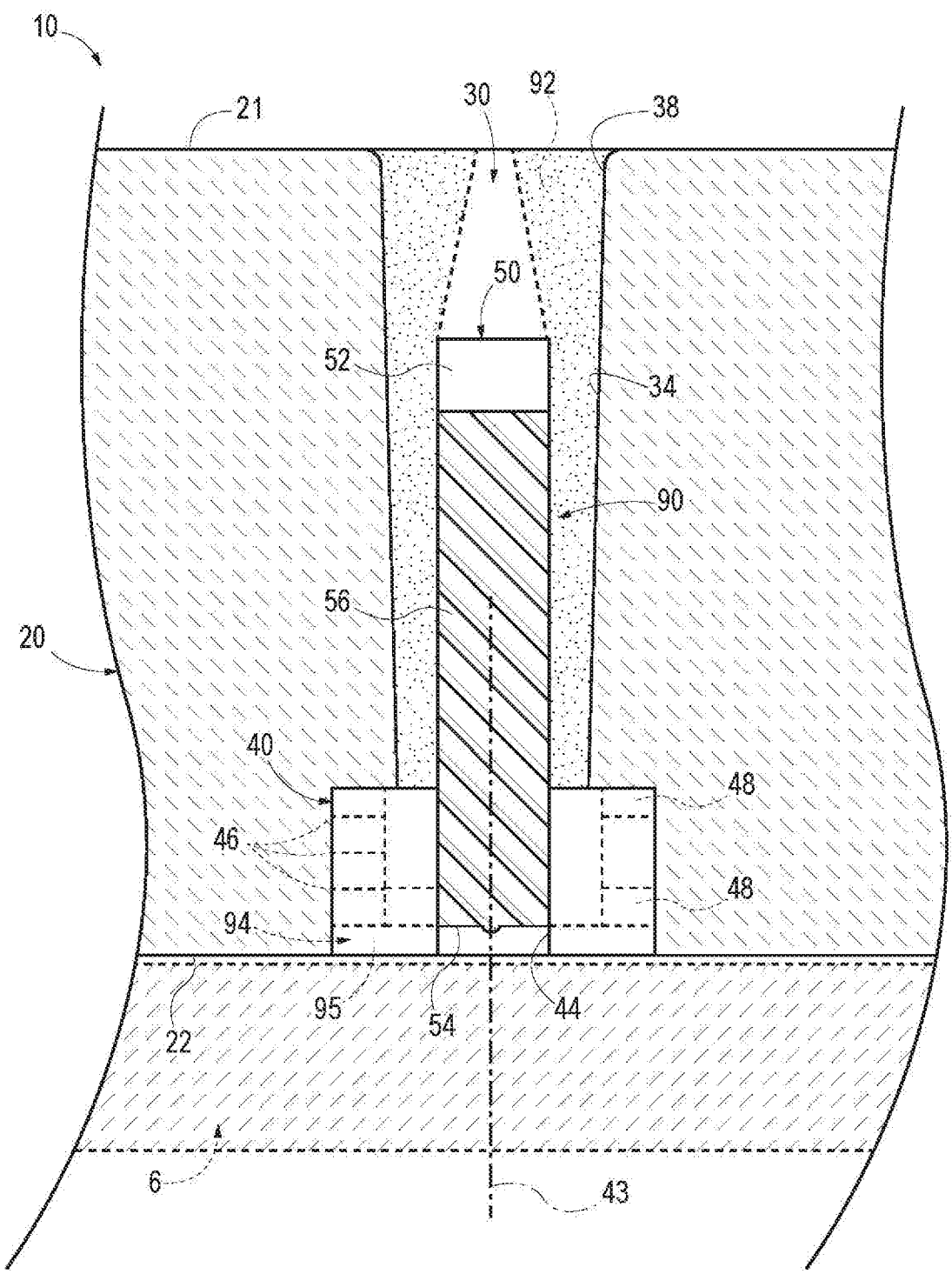
FIG. 2 is a less schematic illustration of an example of an adjustable fixture according to the present disclosure.
Figure 3:
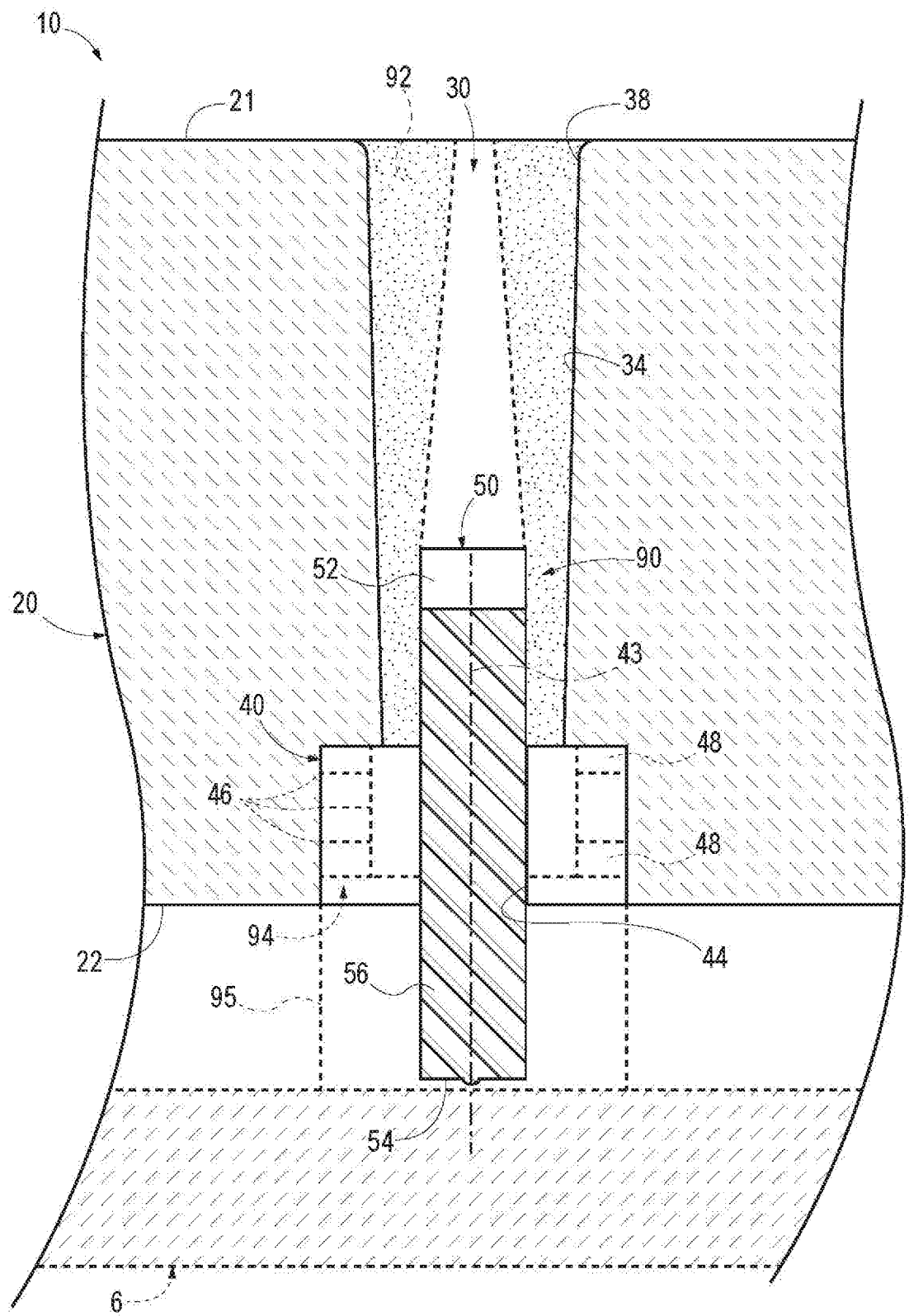
FIG. 3 is another less schematic illustration of an example of an adjustable fixture according to the present disclosure.

FIG. 1 is a schematic illustration of examples of adjustable fixtures 10 for a buried tubular 6, according to the present disclosure. FIGS. 2-3 are less schematic illustrations of examples of a region of adjustable fixtures 10 according to the present disclosure.

As illustrated collectively by FIGS. 1-3, adjustable fixtures 10 include a fixture body 20, a plurality of spaced-apart holes 30, and a plurality of jack-screw-accepting threaded regions 44.

Fixture body 20 includes, defines, and/or has an upper surface 21, a lower surface 22, and, as illustrated in FIG. 1, an opening, or a central opening, 24. Central opening 24 extends between upper surface 21 and lower surface 22 and is sized to provide access to buried tubular 6 and/or to a buried tubular conduit 8 that is defined by the buried tubular. As examples, central opening 24 may be sized to permit and/or facilitate a flow of water into buried tubular conduit 8 and/or human access to and/or into buried tubular conduit 8.

Holes 30 extend between upper surface 21 and lower surface 22, and each hole 30 is at least partially defined by a corresponding jack-screw-accepting threaded region 44. Upper surface 21 may include any surface(s) of fixture body 20 that generally face upward, away from lower surface 22, and/or away from buried tubular 6 when the adjustable fixture is utilized in conjunction with the buried tubular. Similarly, lower surface 22 may include any surface(s) of fixture body 20 that generally face downward, away from upper surface 21, and/or toward the buried tubular.

Figure 4:
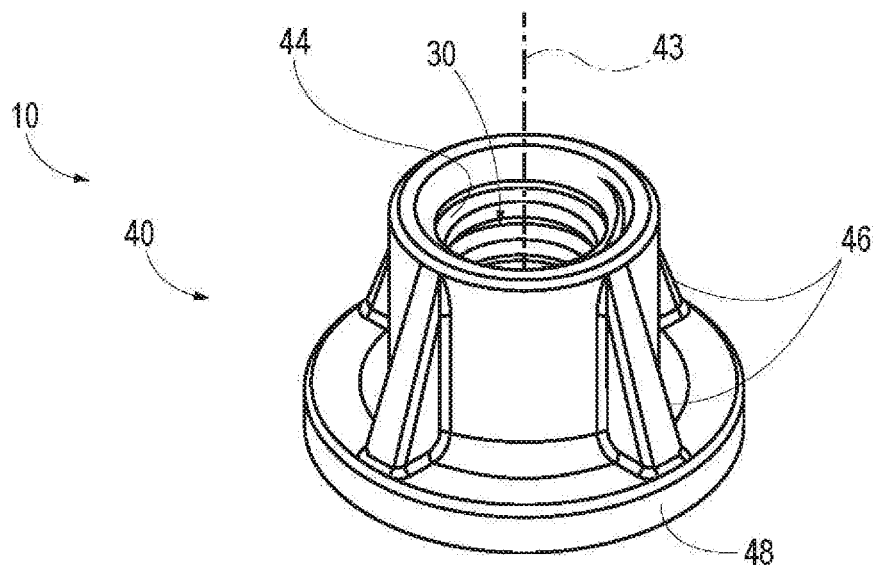
FIG. 4 is an example of a threaded insert that may be included in adjustable fixtures, according to the present disclosure.
Figure 5:
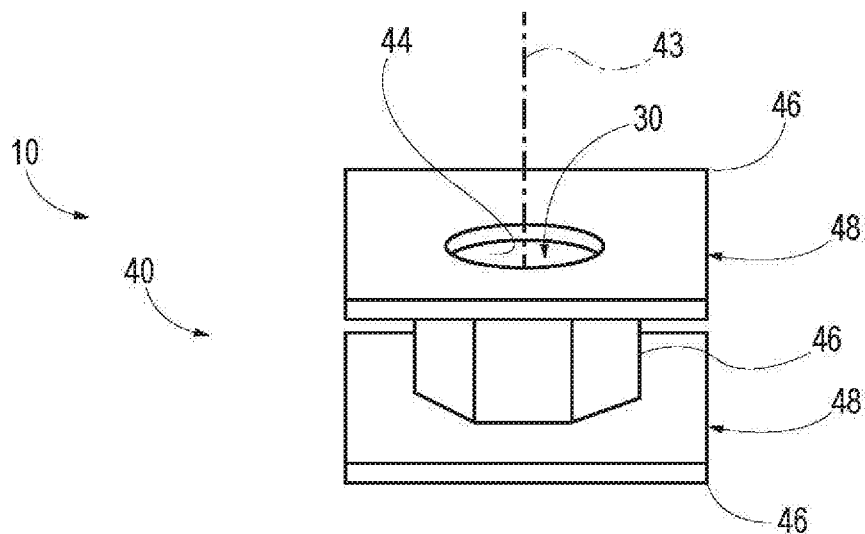
FIG. 5 is another example of a threaded insert that may be included in adjustable fixtures, according to the present disclosure.

Jack-screw-accepting threaded regions 44 may include and/or be defined by any suitable structure that may be configured to receive, or to threadingly receive, jack screws 50 and/or that at least partially defines holes 30. As an example, fixture 10 may include a plurality of threaded inserts 40, and each threaded insert 40 may define a corresponding jack-screw-accepting threaded region 44. Examples of jack-screw-accepting threaded region 44 include a female threaded region, a female thread, a female acme thread, and/or a female coil thread. Illustrations of examples of threaded inserts 40 are shown in FIGS. 4-5. Threaded insert 40 of FIG. 4 also may be referred to herein as a flange nut. Threaded insert 40 of FIG. 5 also may be referred to herein as a hex nut with one or more square washers operatively attached, integrated, or otherwise secured thereto.

It is within the scope of the present disclosure that threaded inserts 40, when present, may include and/or define an anti-rotation feature 46, as illustrated in FIGS. 1-5. Anti-rotation feature 46 may be shaped to resist rotation of threaded inserts 40 relative to fixture body 20, such as during adjustment of fixture 10 and/or during rotation of jack screws 50 within jack-screw-accepting threaded regions 44, as discussed in more detail herein.

Anti-rotation feature 46 may be include and/or be any suitable structure. As an example, anti-rotation feature 46 may include any suitable structure that is rotationally asymmetric about a thread axis 43 of jack-screw-accepting threaded region 44 and/or that is rotationally asymmetric about an elongate axis of a given hole 30 that is at least partially defined by a threaded insert 40 that includes the anti-rotation feature. As another example, anti-rotation feature 46 may define a non-circular cross-sectional shape within a plane that is perpendicular to the thread axis of the jack-screw-accepting threaded region 44.

As more specific examples, anti-rotation feature 46 may include and/or may be defined by a hex nut and/or a hex-shaped structure, as illustrated in FIG. 5. As additional examples, anti-rotation feature 46 may include and/or may be defined by a square washer, a square flange and/or a square-shaped feature, as illustrated in FIG. 5. As additional examples, anti-rotation feature 46 may include and/or may be defined by an anti-rotation projection that projects from the threaded insert, as illustrated in FIG. 5.

As illustrated in dashed lines in FIGS. 1-3 and in solid lines in FIGS. 4-5, threaded inserts 40 may include and/or may be operatively attached to a projecting flange 48, which may be shaped and/or orientated to resist separation of the threaded inserts from fixture body 20. In one example, each threaded insert 40 may be associated with a single projecting flange 48. The single projecting flange may be embedded within fixture body 20. Stated another way, and as illustrated in FIG. 1, threaded inserts 40 may define an upper surface 41 and an opposed lower surface 42 of the threaded inserts, and projecting flange 48 may define, or at least partially define, upper surface 41. Additionally or alternatively, projecting flange 48 may be exposed on lower surface 22 of fixture body 20. Stated another way, projecting flange 48 may define, or at least partially define, lower surface 42 of threaded inserts 40.

In some examples, threaded inserts 40 may include and/or define a first, or an upper, projecting flange 48 that at least partially defines upper surface 41 of threaded insert 40 and a second, or lower, projecting flange 48 that at least partially defines lower surface 42 of threaded insert 40. Such a configuration may provide additional retention for threaded inserts 40 within fixture body 20 and/or may decrease a potential for incorrect orientation of the threaded inserts during formation of the fixture 10.

It is within the scope of the present disclosure that projecting flange 48 may include and/or define anti-rotation feature 46, as illustrated in FIG. 5. However, this is not required of all embodiments, and it is within the scope of the present disclosure that anti-rotation feature 46 and projecting flange 48 may be separate, distinct, and/or spaced-apart structures, as illustrated in FIG. 4. Projecting flange 48 also may be referred to herein as a collar 48.

As yet another example, fixture 10 may include a frame 400, which may be a metallic frame, that may include, form, and/or define jack-screw-accepting threaded regions 44. As an example, jack-screw-accepting threaded regions 44 may be formed, cast, and/or machined within frame 400. As another example, threaded inserts 40 may be operatively attached to frame 400, such as via welding, brazing, and/or an interference fit. In yet another example, fixture body 20 may be formed and/or molded around at least a portion, or region, of frame 400. Stated another way, frame 400 may be operatively attached, or adhered, to fixture body 20. Stated yet another way, fixture body 20 may at least partially, or even completely, encapsulate frame 400.

Examples of frames 400 include a reversible rectangular storm grate frame, a circle frame that may utilize a cover in the form of a manhole cover, a combination inlet frame that may utilize a cover in the form of a grate, and/or a dual frame that may utilize covers in the form of dual-vaned grates.

Fixture body 20 may include any suitable structure that may include and/or define upper surface 21, lower surface 22, holes 30, and/or central opening 24. In addition, fixture body 20 may have and/or define any suitable shape. As examples, a perimeter, or an outer perimeter, of fixture body 20, such as may be measured within a plane that is parallel to upper surface 21, may be circular, at least substantially circular, square, at least substantially square, rectangular, and/or at least substantially rectangular. Additionally or alternatively, a perimeter, or an outer perimeter, of central opening 24, such as may be measured within the plane that is parallel to upper surface 21, may be circular, at least substantially circular, square, at least substantially square, rectangular, and/or at least substantially rectangular.

As illustrated in FIG. 1, fixture body 20 may have and/or define a body thickness 26, or an average body thickness, 26, which may be measured between upper surface 21 and lower surface 22. Examples of body thickness 26 include thicknesses of at least 2.5 centimeters (cm), at least 5 cm, at least 7.5 cm, at least 10 cm, at least 12.5 cm, at least 15 cm, at least 17.5 cm, at least 20 cm, at most 30 cm, at most 25 cm, at most 20 cm, and/or at most 17.5 cm.

Fixture body 20 additionally or alternatively may have and/or define a maximum extent 28. Maximum extent 28 may be greater than body thickness 26. As examples, a ratio of maximum extent 28 of the fixture body to the body thickness 26 include ratios of at least 2, at least 4, at least 6, at least 8, at least 10, at least 12, at least 14, at least 16, at least 18, at least 20, at most 25, at most 20, at most 17.5, at most 15, at most 12.5, at most 10, at most 7.5, and/or at most 5. Additionally or alternatively, central opening 24 may have and/or may define a maximum extent 25. Examples of ratios of maximum extent 28 of fixture body 20 to the maximum extent 25 of central opening 24 include ratios of at least 1.05, at least 1.1, at least 1.15, at least 1.2, at least 1.25, at least 1.3, at most 2, at most 1.9, at most 1.8, at most 1.7, at most 1.6, at most 1.5, at most 1.4, at most 1.3, and/or at most 1.2.

Fixture body 20 may be formed and/or defined by any suitable material, or body material. As examples, fixture body 20 may include and/or be one or more of a composite material, concrete, and/or reinforced concrete.

As illustrated in dashed lines in FIG. 1 and in solid lines in FIGS. 2-3, fixture 10 may include at least one jack screw 50. Jack screw 50, when present, may be threaded within a selected jack-screw-accepting threaded region 44, as illustrated in FIGS. 2-3. FIG. 1 illustrates a plurality of jack screws 50 disengaged from corresponding jack-screw-accepting threaded regions 44, while FIGS. 2-3 illustrate a single jack screw 50 threaded within a corresponding jack-screw-accepting threaded region 44. It is within the scope of the present disclosure that any of the examples of adjustable fixtures 10 may include any suitable number of jack-screw-accepting threaded regions 44 and/or corresponding jack screws 50. As an example, adjustable fixtures 10 may include at least 2, at least 3, and/or at least 4 jack-screw-accepting threaded regions 44 and/or corresponding jack screws 50. Increasing the number of jack-screw-accepting threaded regions 44 (and corresponding jack screws 50) may enable a greater degree of adjustment and/or support of the fixture 10.

Figure 8:
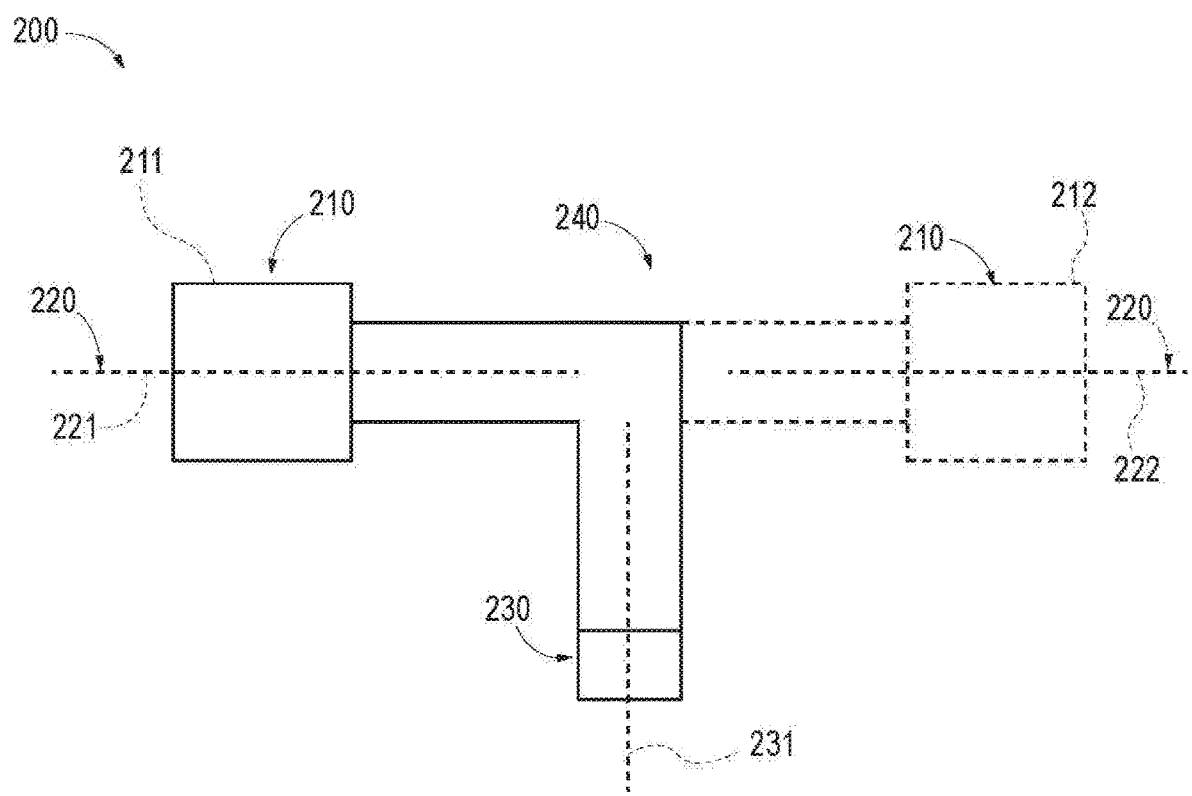
FIG. 8 is a schematic illustration of an example of an adjustment tool that may be utilized with adjustable fixtures, according to the present disclosure.

Jack screws 50, when present, may include a jack screw drive end 52, a jack screw load-bearing end 54, and/or a threaded jack screw shaft 56. Jack screw drive end 52 may be shaped to operatively interlock with a drive tool, such as an adjustment tool 200 that is illustrated in FIG. 8 and discussed in more detail herein with reference thereto. As examples, jack screw drive end 52 may include a square head and/or a hex head. As a more specific example, jack screw drive end 52 may include a ½-inch (12 or 13 mm) square head.

Jack screw load-bearing end 54 may be shaped to contact an underlying structure, such as buried tubular 6, that supports fixture 10. As examples, jack screw load-bearing end 54 may include a conic shape, an at least partially conic shape, blunted conic shape, a spherically blunted conic shape, and/or a pointed shape. Such a shape for jack screw load-bearing end 54 also may be referred to herein as an anti-walk tip and may be configured to decrease a potential for relative motion between the jack screw and the buried tubular upon rotation of the jack screw while the jack screw is operatively engaged with the buried tubular. Additionally or alternatively, such a shape for the jack screw load-bearing end may decrease friction between the jack screw and the buried tubular, thereby decreasing a torque that needs to be applied to the jack screw by a user to rotate the jack screw.

Threaded jack screw shaft 56 may extend between the jack screw drive end and the jack screw load-bearing end and may be shaped to thread into and/or within jack-screw-accepting threaded region 44. Stated another way, a thread and/or a thread pitch of threaded jack screw shaft 56 may match, or compliment, a thread and/or a thread pitch of jack-screw-accepting threaded region 44. In addition, and as illustrated in FIG. 1, a length 57 of the threaded jack screw shaft may be greater than a length 45 of the selected jack-screw-accepting threaded region into which the jack screw is threaded. Such a configuration may permit and/or facilitate adjustment of an orientation of fixture 10 relative to buried tubular 6 via rotation of jack screws 50 and/or via extension of one or more jack screws 50 below lower surface 22 of fixture body 20 and/or against buried tubular 6, as illustrated in FIGS. 2-3.

As illustrated in dashed lines in FIG. 1 and in solid lines in FIGS. 2-3, adjustable fixture 10 may define an annular space 90 that may extend between jack screw 50 and a selected hole 30 within which the jack screw is positioned. Under these conditions, fixture 10 further may include a resilient material 92. Resilient material 92, when present, may extend within annular space 90, may partially fill annular space 90, may completely fill annular space 90, and/or may restrict entry of particulate material into annular space 90 via an opening into the annular space that is defined on upper surface 21 of fixture body 20. Stated another way, resilient material 92 may fill, or at least partially fill, a void space within hole 30, thereby preventing and/or restricting accumulation of the particulate material within the hole. However, resilient material 92 may be soft enough to permit and/or facilitate adjustment of jack screw 50, such as via adjustment tool 200 of FIG. 8, while the resilient material is positioned within the hole. Stated another way, adjustment tool 200 may extend through and/or deform the resilient material to permit and/or facilitate adjustment of the jack screw. Examples of resilient material 92 include a foam, a compressible foam, and/or a closed-cell foam.

As illustrated in dashed lines in FIG. 1, fixture 10 may include a threaded plug 60. Threaded plug 60, when present, may be threaded, or selectively threaded, within a selected jack-screw-accepting threaded region 44. Additionally or alternatively, a corresponding threaded plug 60 may be threaded into each jack-screw-accepting threaded region 44 of fixture 10. Threaded plugs 60 may be shaped, sized, and/or configured to protect jack-screw-accepting threaded regions 44 and/or to restrict entry of particulate material into the jack-screw-accepting threaded regions, such as during initial siting of adjustable fixtures 10 and/or when the grade is being changed proximate adjustable fixtures 10.

As illustrated in FIG. 1, threaded plugs 60 may include a plug drive end 62 and a threaded plug shaft 64. Plug drive end 62 may be shaped to operatively interlock with a drive tool, such as adjustment tool 200 of FIG. 8. As an example, plug drive end 62 may be slotted and/or may be shaped to operatively interlock with a slotted drive tool or a screwdriver. Other examples include plug drive end 62 having a socket, a hex, or other recession or protrusion that is operatively interlocked by a corresponding drive tool. Threaded plug shaft 64 may be shaped to thread into and/or within jack-screw-accepting threaded region 44. Stated another way, a thread and/or a thread pitch of threaded plug shaft 64 may match, or compliment, a thread and/or a thread pitch of jack-screw-accepting threaded region 44. In addition, a length 65 of the threaded plug shaft may be less than, or at most equal to, the length 45 of jack-screw-accepting threaded regions 44. Such a configuration may permit and/or facilitate complete insertion of threaded plugs 60 into jack-screw-accepting threaded regions 44 even when lower surface 22 of fixture body 20 rests against buried tubular 6.

Figure 6:
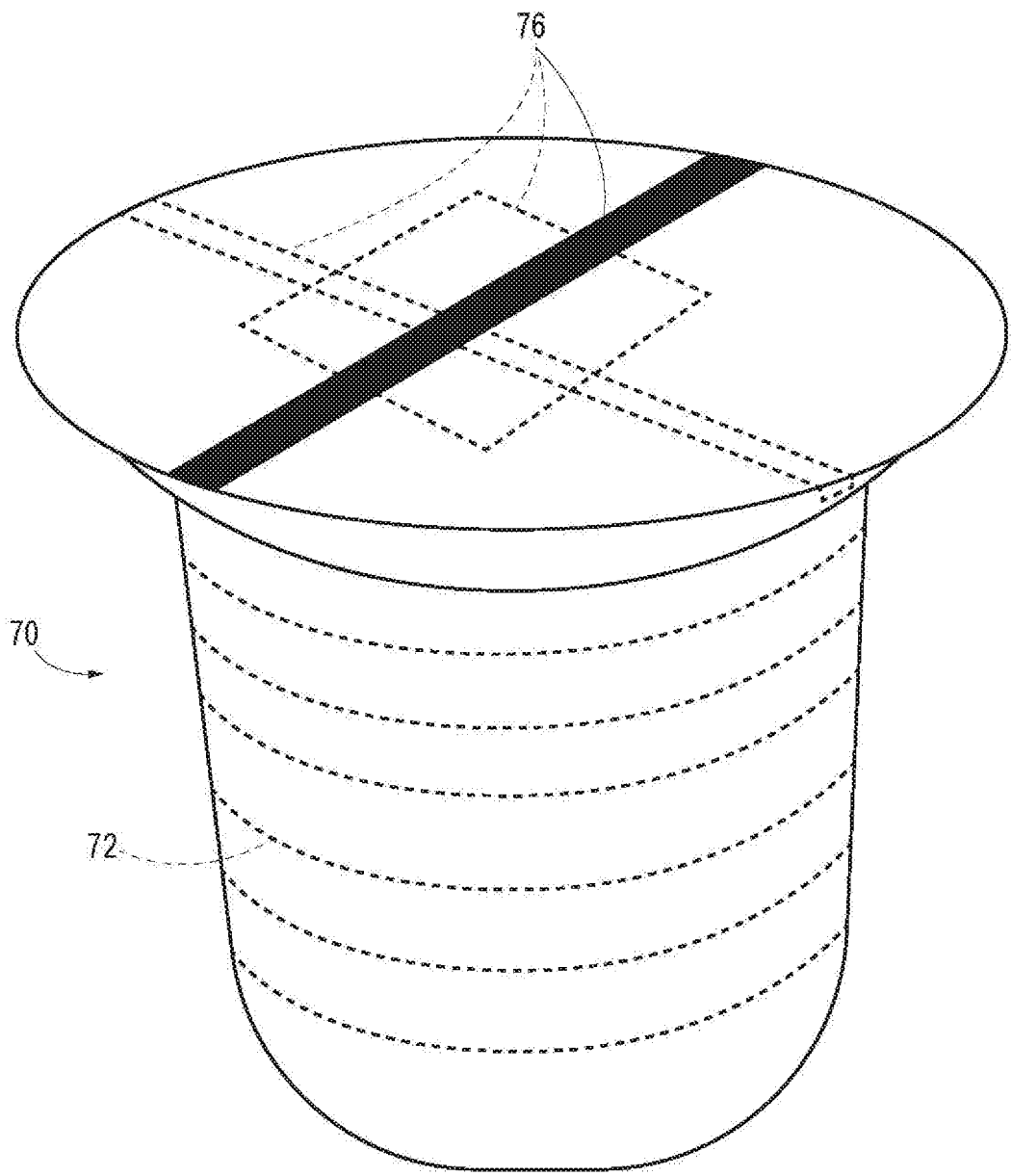
FIG. 6 is an illustration of an example of a cap that may be utilized with adjustable fixtures, according to the present disclosure.

As also illustrated in dashed lines in FIG. 1, fixture 10 may include a cap 70, and FIG. 6 is a less schematic illustration of examples of cap 70. Cap 70, when present, may be positioned within a selected hole 30 and may be configured to prevent and/or restrict entry of foreign material and/or particulate matter into the selected hole via a region of the selected hole that is defined by and/or proximal upper surface 21. Additionally or alternatively, fixture 10 may include a plurality of caps 70, with each cap being positioned within each hole 30. Cap 70 also may be referred to herein as a plug 70, as a debris plug 70, and/or as a debris cap 70.

It is within the scope of the present disclosure that caps 70 may be shaped and/or sized for a friction fit within holes 30. Additionally or alternatively, it is also within the scope of the present disclosure that holes 30 may include a cap-accepting threaded region 32 that is spaced-apart from jack-screw-accepting threaded region 44 and that at least partially defines the hole. Under these conditions, caps 70 may include a cap threaded region 72 that may be threaded into cap-accepting threaded region 32. When fixtures 10 include cap-accepting threaded region 32, a cap thread pitch of cap-accepting threaded region 32 that at least partially defines a given hole 30 may be equal, or at least substantially equal, to the jack screw thread pitch of jack-screw-accepting threaded region 44 that at least partially defines the given hole 30. Such a configuration may permit and/or facilitate formation of holes 30 utilizing forming tools 100, as discussed in more detail herein.

Caps 70 may be configured to be removed from holes 30 to permit and/or facilitate insertion and/or rotation of jack screws 50. Additionally or alternatively, caps 70 may be configured to permit and/or facilitate insertion and/or adjustment of jack screws 50 while caps 70 are positioned within holes 30. As an example, and as illustrated in FIG. 1, caps 70 may include a resilient central region 74 that may be configured to deform to permit jack screws 50 and/or adjustment tools 200 of FIG. 8 to pass therethrough. Examples of resilient central region 74 include a resilient foam central region and/or a resilient bristle-lined central region.

As also illustrated in dashed lines in FIG. 1 and in solid lines in FIG. 6, cap 70 may include a cap drive end 76. Cap drive end 76 may be configured to interface with an insertion and/or removal tool, such as adjustment tools 200 of FIG. 8, to permit and/or facilitate insertion and/or removal of cap 70 from fixture body 20 and/or from holes 30 thereof. Examples of cap drive end 76 include a slotted drive end, as illustrated in solid lines in FIG. 6, a Philips drive end, as illustrated by the combination of solid and dashed lines in FIG. 6, and/or a square drive end, as illustrated in dashed lines in FIG. 6. FIG. 6 also illustrates that cap drive end 76 may include two slotted drive ends. In such an example, and should one of the slots become damaged, the other still may be utilized.

As illustrated in dashed lines in FIG. 1, fixture 10 may include and/or fixture body 20 may define, or at least partially define, a support structure 80 that may be shaped, sized, and/or configured to support a cover 82. Cover 82 may extend across central opening 24 and/or may at least partially restrict entry into the buried tubular conduit via central opening 24. An example of support structure 80 includes a restricted, or an at least partially restricted region, within central opening 24. Examples of cover 82 include a storm grate cover, a water-permeable cover, a manhole cover, an access cover, and/or a water-impermeable cover.

Turning now to the example of adjustable fixture 10 that is less schematically illustrated in FIGS. 2-3, and with continued general reference to FIG. 1, each hole 30 may define a tapered hole region 34, which also may be referred to herein as a female tapered hole region 34 and/or as a hole draft region 34. Tapered hole region 34, when present, may extend at least partially between upper surface 21 and a corresponding jack-screw-accepting threaded region 44 in each hole 30. Tapered hole region 34 may taper away from upper surface 21 and/or may taper, or decrease in cross-sectional area, toward jack-screw-accepting threaded region 44. Tapered hole region may have and/or define any suitable shape. As an example, tapered hole region may be conic, or at least partially conic.

As illustrated in FIG. 1, each hole 30 additionally or alternatively may include and/or define a cylindrical hole region 36. Cylindrical hole region 36, when present, may extend from upper surface 21 and/or may extend to and/or toward tapered hole region 34. When holes 30 include both cylindrical hole region 36 and tapered hole region 34, the holes also may include a transition hole region 38 that transitions between tapered hole region 34 and cylindrical hole region 36. Additionally or alternatively, and when holes 30 include tapered hole region 34, transition hole region 38 may extend between upper surface 21 and the tapered hole region, as illustrated in FIGS. 2-3. Examples of transition hole region include a rounded hole region and/or a chamfered hole region. Cap-accepting threaded region 32, when present, may be defined within tapered hole region 34 and/or within cylindrical hole region 36.

With continued reference to FIG. 1, it is within the scope of the present disclosure that fixture 10 may include and/or may be utilized with a plurality of eye bolts 84. Eye bolts 84, when present, may include an eye region 86 and a threaded bolt shaft 88. Threaded bolt shaft 88 may extend from eye region 86 and may be threaded into a corresponding jack-screw-accepting region of fixture 10 such that eye region 86 extends above upper surface 21 of fixture body 20.

Such a configuration may permit and/or facilitate initial placement of fixture 10, such as by lifting the fixture via eye bolts 84.

As schematically illustrated in dashed lines in FIGS. 1-3, adjustable fixture 10 may include and/or utilize an expanding shield 95. Expanding shield 95, when present, may be incorporated into, may be stored within, and/or may at least partially define projecting flange 48 and/or anti-rotation feature 46, which are discussed in more detail herein.

Additionally or alternatively, fixture body 20, projecting flange 48, anti-rotation feature 46, and/or threaded insert 40 may have and/or define a recess 94 that may be shaped and/or sized to receive and/or to store expanding shield 95.

Expanding shield 95, when present, may be configured to surround jack screw 50 and/or to surround a portion of jack screw 50 that extends below lower surface 22 of fixture body 20, as illustrated in FIG. 3. Such a configuration may decrease a potential for damage to jack screw 50 and/or may decrease a potential for the threads of jack screw 50 to become clogged with debris, concrete, and/or grout. Stated another way, the presence of expanding shield 95 may permit, may facilitate, and/or may increase an ease of adjustment of adjustable fixture 10 via rotation of jack screws 50. This may be especially true for adjustments that may occur a significant period of time after installation of adjustable fixture 10 and/or subsequent to grout being applied to a gap between adjustable fixture 10 and a buried tubular.

Expanding shield 95 may include any suitable structure that may stretch, bellows out, telescope out, and/or expand as jack screw 50 extends below lower surface 22 of fixture body 20. Additionally or alternatively, expanding shield 95 may include any suitable structure that may contract, telescope in, and/or bellows in as jack screw 50 is retracted into fixture body 20.

Examples of expanding shield 95 include a telescopic steel cover and/or a resilient bellows.

Figure 7:
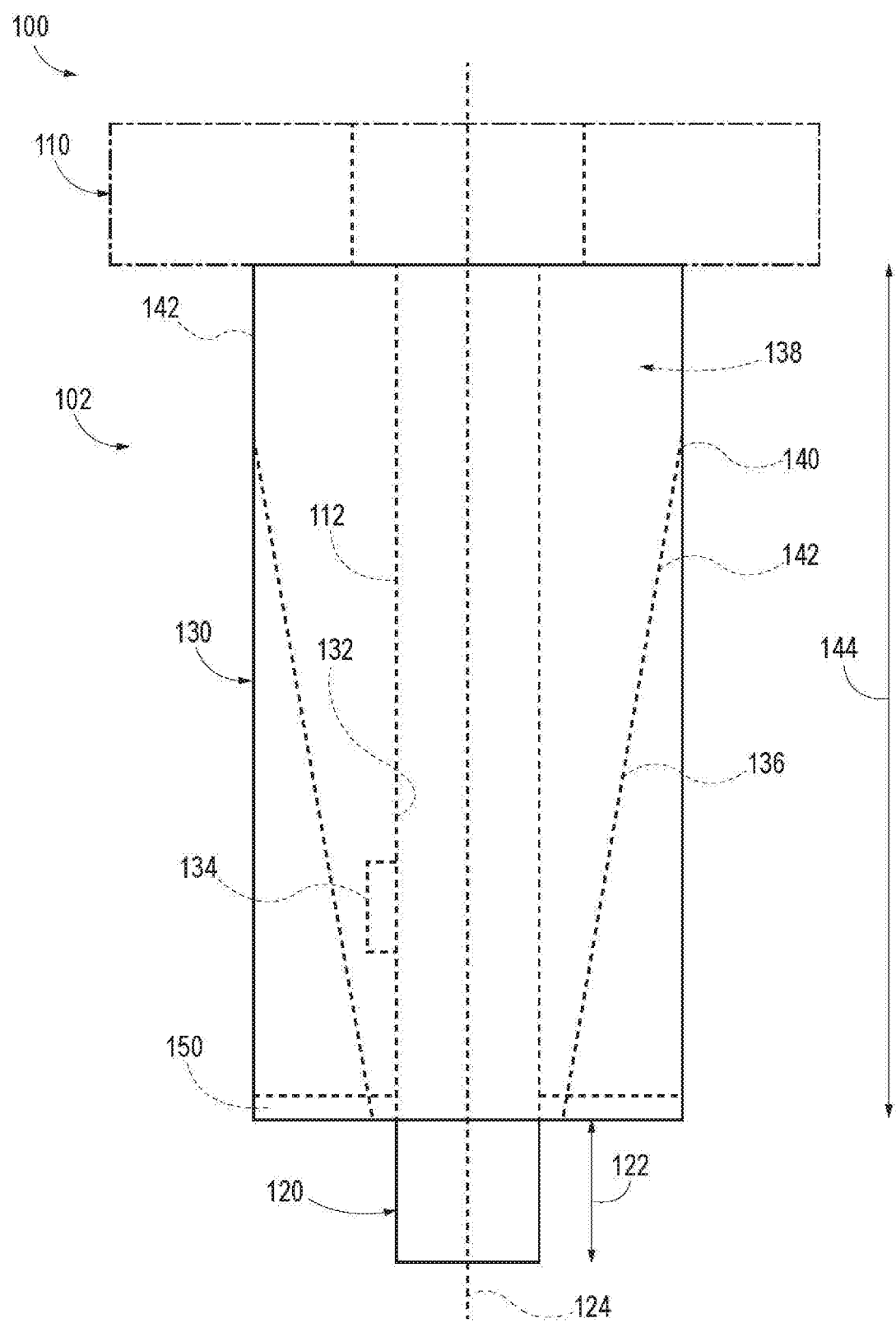
FIG. 7 is a schematic illustration of an example of a forming tool that may be utilized to form an adjustable fixture, according to the present disclosure.

FIG. 7 is a schematic illustration of examples of forming tools 100 for defining a hole in an adjustable fixture, according to the present disclosure. As illustrated in FIG. 7, forming tools 100 include a forming tool engagement structure 110, a threaded tool end region 120, and a hole-defining body 130.

Forming tool engagement structure 110 may include any suitable structure that may permit and/or facilitate utilization of forming tools 100. In some examples, and as illustrated in dash-dot lines in FIG. 7, forming tool engagement structure 110 may extend past hole-defining body 130 and/or may be configured to be gripped by a user of forming tools 100. An example of such a forming tool engagement structure includes a T-handle. In some examples, and as illustrated in dashed lines in FIG. 7, forming tool engagement structure 110 may not extend past hole-defining body 130 and/or may be configured to operatively engage with a wrench, a ratchet wrench, an impact wrench, a pneumatic drive tool, and/or an electric drive tool. Examples of such a forming tool engagement structure include a hex head and/or a socket head.

In some examples, forming tool engagement structure 110 may be operatively attached to hole-defining body 130. As an example, forming tool 100 may include a tool shaft 112 that extends from forming tool engagement structure 110. In this example, hole-defining body 130 may be operatively attached to tool shaft 112. As a more specific example, hole-defining body 130 may include and/or define a central hole 132, and tool shaft 112 may extend through the central hole. In such an example, and as illustrated in FIG. 7, hole-defining body 130 may include a body retention structure 134, which may retain the hole-defining body on tool shaft 112. An example of body retention structure 134 includes a set screw. As another example, forming tool engagement structure 110 may be configured to separably engage with a remainder of forming tool 100.

In some examples, forming tool 100 may include a unitary, or a monolithic, forming tool body 102 that may form and/or define two or more components of the forming tool. As examples, forming tool body 102 may form and/or define forming tool engagement structure 110, threaded tool end region 120, and/or hole-defining body 130. Forming tool body 102 may include any suitable material, examples of which include a polymer, a metal, steel, and/or stainless steel.

Threaded tool end region 120 may extend away from forming tool engagement structure 110. As an example, threaded tool end region 120 may be defined by, or on an end of, tool shaft 112 and/or may be defined by, or on an end of forming tool body 102. Threaded tool end region 120 may define a male thread, examples of which include an acme thread and/or a coil thread. Threaded tool end region 120 may be configured to thread into jack-screw-accepting threaded regions 44 of fixtures 10, as discussed in more detail herein.

It is within the scope of the present disclosure that threaded tool end region 120 may extend from hole-defining body 130 to an end region thread length 122, as illustrated in FIG. 7. End region thread length 122 may be less than jack-screw-accepting thread length 45 of jack-screw-accepting threaded region 44, which is illustrated in FIG. 1. Such a configuration may permit and/or facilitate utilization of forming tool 100 to form and/or define adjustable fixtures 10, such as via and/or utilizing methods 300, which are discussed in more detail herein.

Hole-defining body 130 may extend at least partially, or even completely, between forming tool engagement structure 110 and threaded tool end region 120. Threaded tool end region 120 may define a thread axis 124, and hole-defining body 130 may be symmetric, or rotationally symmetric, about thread axis 124. Such a configuration may permit and/or facilitate removal of forming tool 100 from fixtures 10 subsequent to forming fixtures 10, as is discussed in more detail herein. Thread axis 124 may extend through forming tool engagement structure 110, and/or the T-handle, when present, may extend perpendicular, or at least substantially perpendicular, to the thread axis.

As illustrated in dashed lines in FIG. 7, hole-defining body 130 may include and/or define a tapered body region 136, which also may be referred to herein as a male tapered body region 136 and/or as a body draft region 136. Tapered body region 136 may extend at least partially between forming tool engagement structure 110 and threaded tool end region 120 and/or may taper, or decrease in a cross-sectional area, toward threaded tool end region 120. Tapered body region 136 may be at least partially conic. Such a shape may permit and/or facilitate removal of forming tool 100 from fixtures 10 subsequent to forming the fixtures, as discussed in more detail herein.

Hole-defining body 130 additionally or alternatively may include and/or define a cylindrical body region 138, which also may be referred to herein as a male cylindrical body region 138. Cylindrical body region 138, when present, may extend from a forming-tool-engagement-structure-proximal end of the hole-defining body, may extend toward threaded tool end region 120, and/or may extend toward and/or to tapered body region 136.

Hole-defining body 130 may include and/or define a transition body region 140, which may extend between cylindrical body region 138 and tapered body region 136 and/or between tapered body region 138 and forming tool engagement structure 110. Examples of transition body region 140 include a rounded body edge and/or a chamfered body edge that may be shaped to define transition hole region 38 of FIGS. 1-3.

Tapered body region 136 and/or cylindrical body region 138, when present, may include and/or define a cap-accepting thread defining region 142. Cap-accepting thread defining region 142 may be configured to form, define, and/or shape cap-accepting threaded region 32 of adjustable fixture 10, which is discussed in more detail herein. A cap thread pitch of cap-accepting threaded defining region 142 may be equal, or at least substantially equal, to a jack screw thread pitch of jack-screw-accepting threaded region 44 of fixtures 10 and/or a threaded tool end region thread pitch of threaded tool end region 120. Such a configuration may permit and/or facilitate removal of forming tool 100 from fixtures 10 subsequent to formation of the fixtures, as discussed in more detail herein.

Hole-defining body 130 may include and/or may be defined by any suitable material and/or materials. As examples, hole-defining body 130 may include and/or be a resilient body, a polymeric body, an ultra-high molecular weight polyethylene body, a metallic body, a steel body, and/or a stainless steel body. As another example, hole-defining body 130 may include and/or be an inflatable hole-defining body.

Hole-defining body 130 may define a hole-defining body length 144, which may be measured along a longitudinal axis of the hole-defining body. Examples of hole-defining body length 144 include lengths of at least 2.5 cm, at least 5 cm, at least 7.5 cm, at least 10 cm, at least 12.5 cm, at least 15 cm, at least 17.5 cm, at least 20 cm, at most 30 cm, at most 25 cm, at most 20 cm, and/or at most 17.5 cm.

In some examples, forming tool 100 may be configured to seal against, or to form a fluid seal with, a structure that defines jack-screw-accepting threaded region 44 of adjustable fixture 10 upon threading engagement therewith, as illustrated in FIGS. 1-3. As an example, and as illustrated in FIG. 7, forming tool 100 may include a sealing structure 150. Sealing structure 150, when present, may be formed and/or positioned on a threaded-tool-end-region-proximal end of hole-defining body 130.

Sealing structure 150 may include any suitable structure that may form and/or define a seal, or a fluid seal, with the structure that defines the jack-screw-accepting threaded region 44.

As an example, sealing structure 150 may be defined by hole-defining body 130, such as when hole-defining body 130 is a resilient and/or flexible hole-defining body. As another example, sealing structure 150 may be operatively attached to hole-defining body 130 and/or to threaded tool end region 120. Examples of such a sealing structure include a resilient material, an elastomeric material, an O-ring, and/or a gasket.

FIG. 8 is a schematic illustration of an example of an adjustment tool 200 according to the present disclosure. Adjustment tool 200 may be utilized to adjust an orientation of an adjustable fixture, such as adjustable fixture 10, relative to a buried tubular, such as buried tubular 6.

Adjustment tool 200 also may be referred to herein as a drive tool 200.

As illustrated in FIG. 8, adjustment tool 200 includes a socket drive end 210 that defines a socket drive axis 220 and a slotted drive end 230 that defines a slotted drive axis 231. Adjustment tool 200 also includes an adjustment tool handle region 240 that extends at least partially between and/or operatively interconnects socket drive end 210 and slotted drive end 230. Adjustment tool handle region 240 may be shaped to facilitate rotation of socket drive end 210 about socket drive axis 220 and/or to facilitate rotation of slotted drive end 230 about slotted drive axis 231.

As illustrated in dashed lines in FIG. 8, socket drive end 210 may be a first socket drive end 211 that defines a first socket drive axis 221, and adjustment tool 200 also may include a second socket drive end 212 that defines a second socket drive axis 222. In such a configuration, adjustment tool handle region 240 also may be shaped to facilitate rotation of second socket drive end 212 about second socket drive axis 222.

In some examples, adjustment tool 200 may be T-shaped and/or first socket drive axis 221 may be parallel to and/or coextensive with second socket drive axis 222, when present. In such a configuration, slotted drive axis 231 may be perpendicular, or at least substantially perpendicular, to first socket drive axis 221 and/or to second socket drive axis 222.

Adjustment tool 200 may be configured to engage with jack screws 50 of adjustable fixtures 10, which are illustrated in FIGS. 1-3, and/or to rotate the jack screws relative to a remainder of the adjustable fixtures. With this in mind, socket drive ends 210, including first socket drive end 211 and/or second socket drive end 212, may have and/or define any suitable shape that may engage and/or interlock with jack screw drive ends 52 of jack screws 50. As examples, first socket drive end 211 and/or second socket drive end 212 may be square, may be hex-shaped, and/or may correspond to the shape of jack screw drive ends 52. In some examples, first socket drive end 211 may be a square first socket drive end that has a first size, such as one-half of an inch (12 or 13 mm), and second socket drive end 212 may be a square second socket drive end that has a second size, such as three-eighths of an inch (10 mm), that differs from the first size. In such a configuration, the first socket drive end may be utilized for certain fixtures 10, and the second socket drive end may be utilized for other fixtures 10.

As discussed, adjustment tools 200 may be utilized to adjust the orientation of fixtures 10 that are disclosed herein. More specifically, socket drive end 210 of adjustment tools 200 may be operatively engaged with jack screw drive end 52 of jack screws 50, such as to facilitate rotation of the jack screw with, via, and/or utilizing the adjustment tool. This may, for example, permit and/or facilitate rotation of jack screws 50 between the orientation illustrated in FIG. 2 and the orientation illustrated in FIG. 3.

Figure 9:
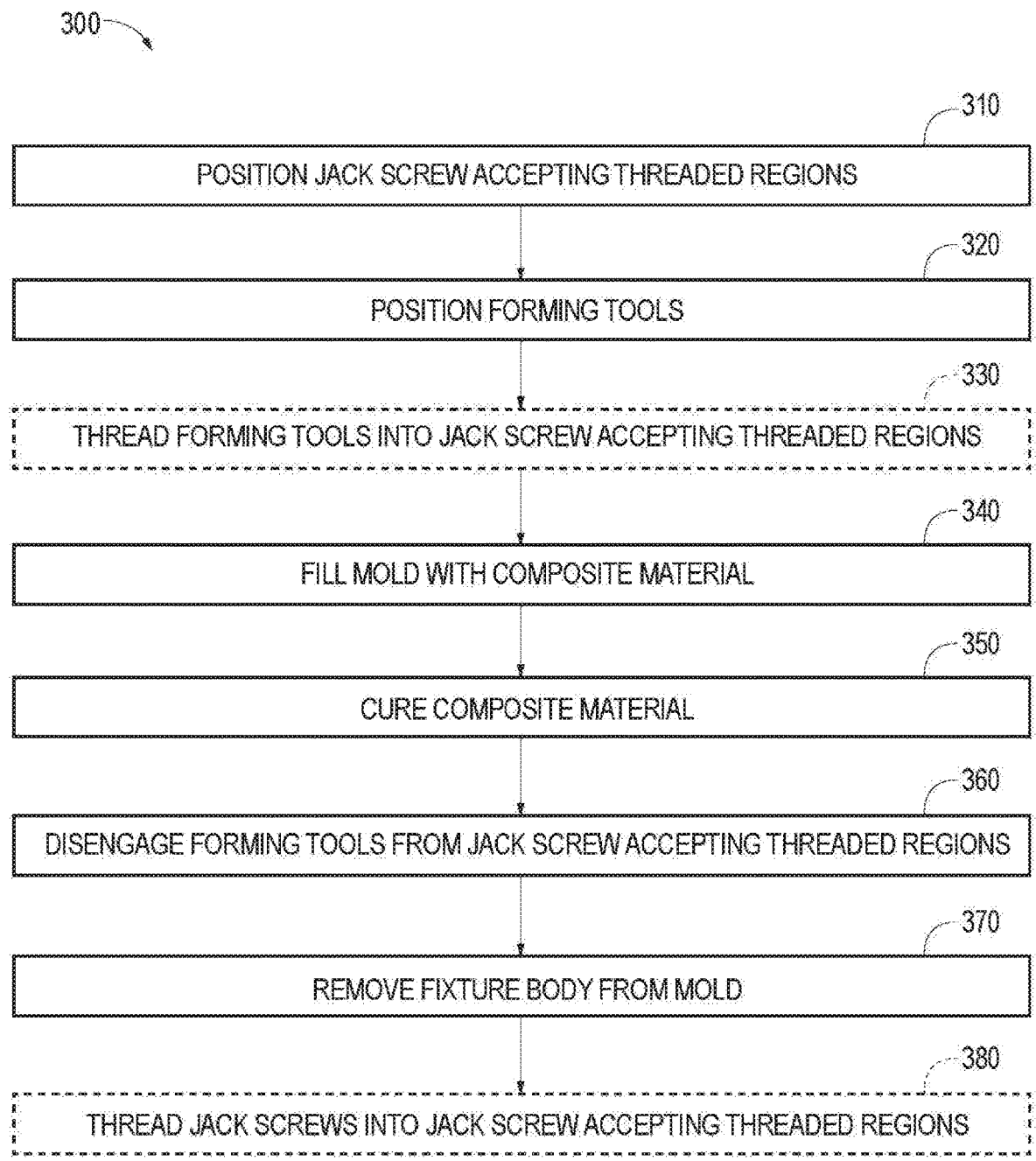
FIG. 9 is a flowchart depicting examples of methods of manufacturing an adjustable fixture for a buried tubular, according to the present disclosure.

FIG. 9 is a flowchart depicting examples of methods 300 of manufacturing an adjustable fixture for a buried tubular, according to the present disclosure. Methods 300 also may be referred to herein as methods of manufacturing a precast adjustable fixture. Methods 300 include positioning a plurality of jack-screw-accepting threaded regions at 310 and positioning a plurality of forming tools at 320. Methods 300 may include threading the plurality of forming tools into the plurality of jack screw-accepting threaded regions at 330, and methods 300 may further include filling a mold for the adjustable fixture with a composite material at 340 and curing the composite material at 350. Methods 300 further include disengaging the forming tools from the jack-screw-accepting threaded regions at 360 and removing the fixture body from the mold at 370. Methods 300 further may include threading jack screws into the jack-screw-accepting threaded regions at 380.

Figure 10:
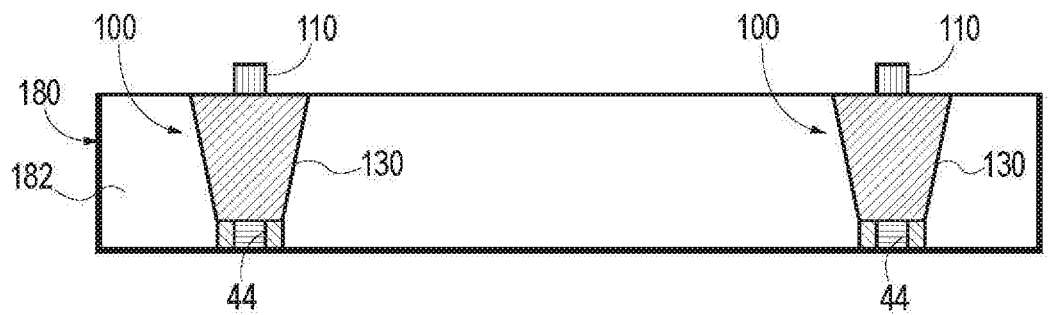
FIG. 10 is a schematic cross-sectional view illustrating an example of a portion of the methods of FIG. 9.

Positioning the plurality of jack-screw-accepting threaded regions at 310 may include positioning the plurality of jack-screw-accepting threaded regions within the mold for the adjustable fixture and/or within a fixture-defining cavity of the mold. Similarly, positioning the plurality of forming tools at 320 may include positioning the plurality of forming tools within the mold for the adjustable fixture and/or within a fixture-defining cavity of the mold. Examples of the plurality of jack-screw-accepting threaded regions are disclosed herein with reference to jack-screw-accepting threaded regions 44 of FIGS. 1-5. An example of the plurality of forming tools are disclosed herein with reference to forming tool 100 of FIG. 7. An example of the positioning at 310 is illustrated in FIG. 10, with a plurality of jack-screw-accepting threaded regions 44 being positioned within a mold 180 and/or within a fixture-defining cavity 182 thereof.

Figure 11:
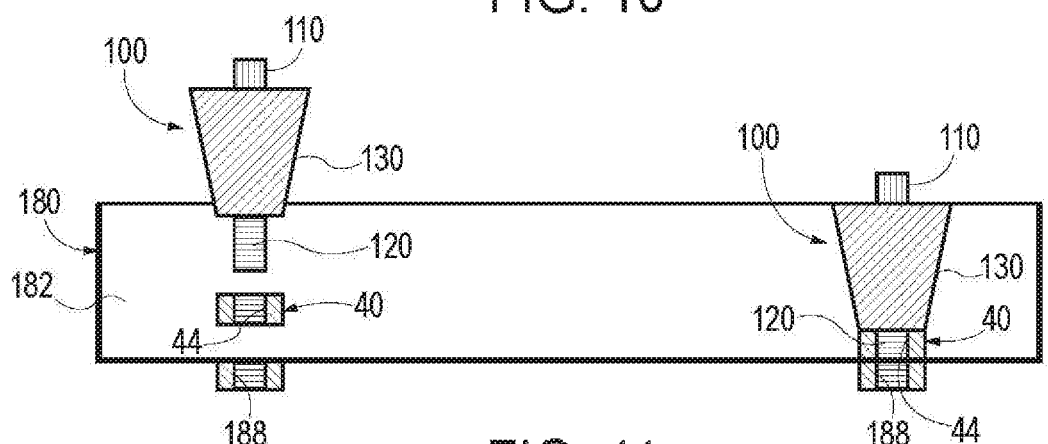
FIG. 11 is a schematic cross-sectional view illustrating an example of a portion of the methods of FIG. 9.
Figure 12:
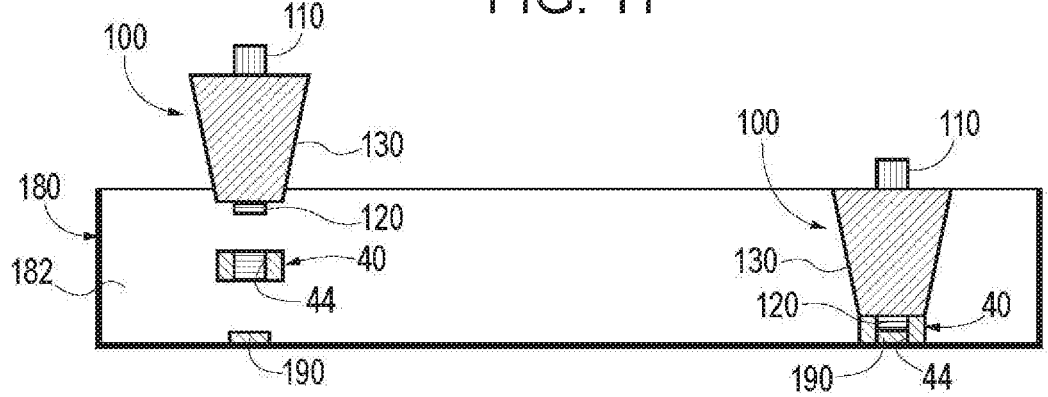
FIG. 12 is a schematic cross-sectional view illustrating an example of a portion of the methods of FIG. 9.

In some examples, the plurality of jack-screw-accepting threaded regions may be defined by a plurality of threaded inserts, examples of which are disclosed herein with reference to threaded inserts 40 of FIGS. 1-5. In these examples, the positioning at 310 may include positioning the plurality of threaded inserts within the mold. This may include sequentially, or at least partially sequentially, positioning the plurality of threaded inserts, or the corresponding plurality of jack-screw-accepting threaded regions, within the mold. Also in these examples, the positioning at 320 may include positioning such that a corresponding forming tool extends from each of the threaded inserts. Examples of positioning threaded inserts 40 and/or forming tools 100 within mold 180 and/or within fixture-defining cavity 182 thereof are illustrated in FIGS. 11-12.

Figure 13:
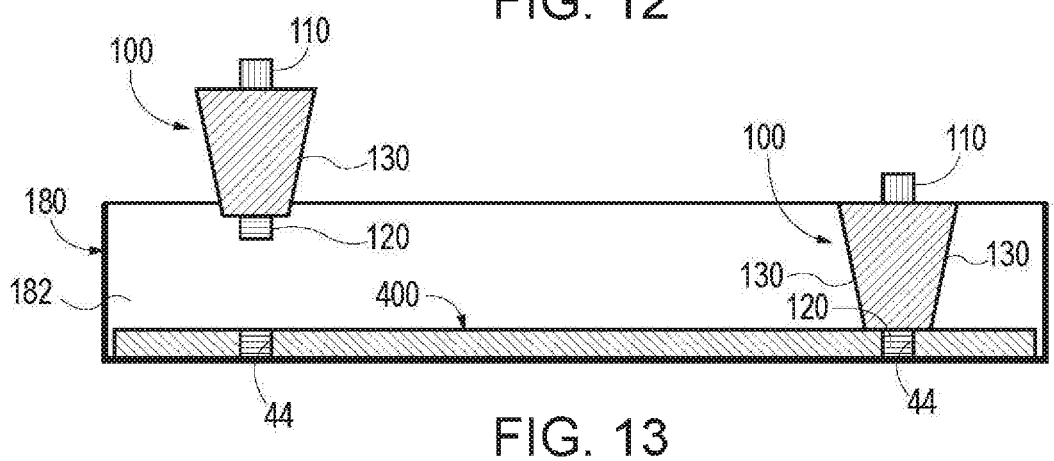
FIG. 13 is a schematic cross-sectional view illustrating an example of a portion of the methods of FIG. 9.

In some such examples, methods 300 may include simultaneously, or at least substantially simultaneously, performing the positioning at 310 and the positioning at 320. As an example, forming tool 100 may include a threaded tool end region, examples of which are disclosed herein with reference to threaded tool end region 120 of FIGS. 1-3 and also are illustrated in FIGS. 11-13. In these examples, methods 300 may include performing the threading at 330 to thread a corresponding threaded tool end region into each jack-screw-accepting threaded region prior to positioning the plurality of jack-screw-accepting threaded regions within the mold during the positioning at 310 and also prior to positioning the plurality of forming tools within the mold during the positioning at 320.

In some such examples, the mold for the adjustable fixture may include a plurality of retention threaded regions. In these examples, the positioning at 310 and/or the positioning at 320 may include threading a corresponding threaded tool end region of the corresponding forming tool into a corresponding retention threaded region and may be performed subsequent to the threading at 330. In these methods 300, the positioning at 310, the positioning at 320, and/or the threading at 330 may be performed such that a corresponding threaded insert extends between, or at least partially between, a corresponding hole-defining body of the corresponding forming tool and the mold. This is illustrated on the right side of FIG. 11, with threaded tool end region 120 being threaded into both jack-screw-accepting threaded region 44 of threaded insert 40 and also into a retention threaded region 188 of mold 180.

In some such examples, the mold may include a plurality of locator studs. In such a configuration, the positioning at 310 may include positioning a corresponding threaded insert on each locator stud. As an example, the positioning at 310 may include extending each locator stud at least partially within a corresponding jack-screw-accepting threaded region of each threaded insert. The locator studs and/or the threaded inserts may be magnetic and/or may be formed from a magnetic material. Under these conditions, the positioning at 310 may include magnetically retaining a corresponding threaded insert on each locator stud. This is illustrated on the right side of FIG. 12, with threaded insert 40 being positioned on locator stud 190.

In some examples, the positioning at 310 may include positioning a frame within the mold and/or within the fixture-defining cavity of the mold. In this example, the frame may include and/or define the plurality of jack-screw-accepting threaded regions. As such, the positioning at 310 may include simultaneously, or at least substantially simultaneously, positioning the plurality of jack-screw-accepting threaded regions within the mold. The frame may include and/or be a metallic, or a ferromagnetic, frame, and the positioning at 310 may include magnetically retaining the frame at a predetermined location within the mold. Examples of the frame are disclosed herein with reference to frames 400 of FIG. 1. Positioning the frame within the mold is illustrated in FIG. 13, with a frame 400 being positioned within mold 180 and/or within fixture-defining cavity 182 thereof.

The positioning at 310 may be performed with any suitable timing and/or sequence during methods 300. As examples, the positioning at 310 may be performed prior to the positioning at 320, at least partially concurrently with the positioning at 320, concurrently with the positioning at 320, prior to the threading at 330, subsequent to the threading at 330, and/or prior to the filling at 340. Similarly, the positioning at 320 may be performed with any suitable timing and/or sequence during methods 300. As an example, the positioning at 320 may be performed prior to the filling at 340.

Threading the plurality of forming tools into the plurality of jack-screw-accepting threaded regions at 330 may include threading the threaded tool end region of a corresponding forming tool into each jack-screw-accepting threaded region of the plurality of jack-screw-accepting threaded regions. In one example, this may include threading the corresponding forming tool into each threaded insert of the plurality of threaded inserts. In another example, this may include threading the corresponding forming tool into the frame. The threading at 330 is illustrated by the transition from the left side of FIGS. 11-12, in which jack-screw-accepting threaded regions 44 are spaced apart from corresponding threaded tool end regions 120, to the right side of FIGS. 11-12, in which the corresponding threaded tool end regions are threaded into the jack-screw-accepting threaded regions.

The threading at 330 may include rotating the threaded tool end region of the corresponding forming tool relative to each jack-screw-accepting threaded region, rotating each jack-screw-accepting threaded region relative to the threaded tool end region of the corresponding forming tool, rotating the threaded tool end region of the corresponding forming tool relative to each threaded insert, rotating each threaded insert relative to the threaded tool end region, rotating the threaded tool end region of the corresponding forming tool relative to the frame, and/or rotating the frame relative to the threaded tool end region. Additionally or alternatively, the threading at 330 may include operatively interlocking the corresponding forming tool with each jack-screw-accepting threaded region, with each threaded insert, and/or with the frame.

In some examples, the threading at 330 may include establishing an at least partial fluid seal between the corresponding forming tool and a thread-defining body that defines the corresponding jack-screw-accepting threaded region. As discussed, examples of the thread-defining body include the threaded insert 40 for the frame 400. The threading at 330 may include establishing the fluid seal to resist flow of the composite material into the corresponding jack-screw-accepting threaded region of each threaded insert and/or of the frame. The fluid seal may be established between the hole-defining body of the corresponding forming tool and the thread-defining body and/or the fluid seal may be established with a sealing structure that extends at least partially between the hole-defining body of the corresponding forming tool and the thread-defining body.

The threading at 330 may be performed with any suitable timing and/or sequence during methods 300. As examples, the threading at 330 may be performed prior to the positioning at 310, prior to the positioning at 320, subsequent to the positioning at 320, at least partially concurrently with the positioning at 320, and/or prior to the filling at 340.

Figure 14:
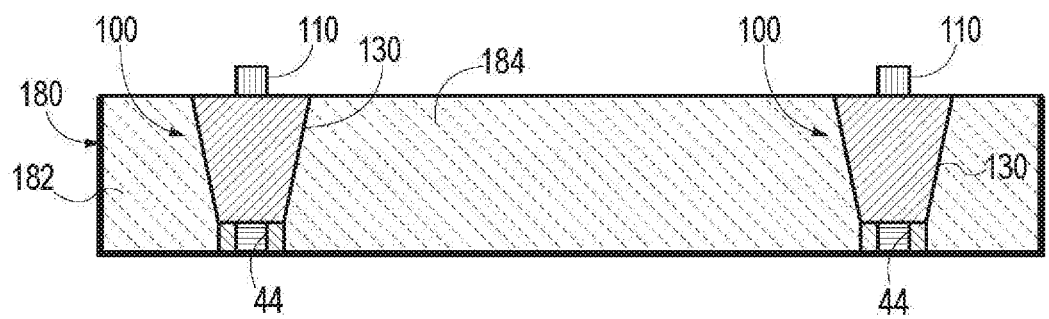
FIG. 14 is a schematic cross-sectional view illustrating an example of a portion of the methods of FIG. 9.
Figure 15:
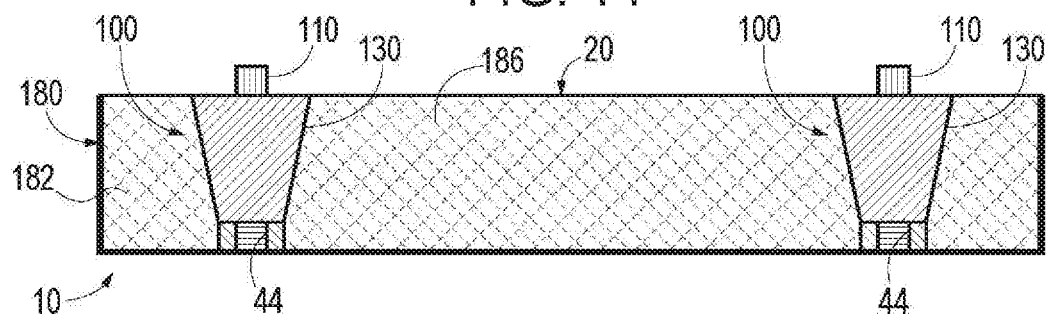
FIG. 15 is a schematic cross-sectional view illustrating an example of a portion of the methods of FIG. 9.

Filling the mold for the adjustable fixture with the composite material at 340 may include filling a fixture-defining cavity of the mold with the composite material and/or with an uncured composite material. This may include encapsulating, or at least partially encapsulating, the hole-defining body of each forming tool with and/or within the composite material. The filling at 340 may include flowing the composite material into the fixture-defining cavity. Additionally or alternatively, the filling at 340 may include establishing an exposed surface of the composite material; and, subsequent to the filling at 340, methods 300 further may include finishing the exposed surface of the composite material. As discussed herein, the composite material may include and/or be uncured concrete. An example of the filling at 340 is illustrated in FIG. 14, where an uncured composite material 184 at least partially fills fixture-defining cavity 182 of mold 180 and/or at least partially encapsulates hole-defining bodies 130 of forming tools 100.

Curing the composite material at 350 may include curing to harden, to form, and/or to define the fixture body of the adjustable fixture. This may include waiting at least a threshold cure time prior to performing the disengaging at 360, the removing at 370, and/or the threading at 380. Examples of the threshold cure time include threshold cure times of at least 10 minutes, at least 20 minutes, at least 30 minutes, at least 40 minutes, at least 50 minutes, at least 1 hour, at least 2 hours, at least 3 hours, at least 4 hours, and/or at least 5 hours. The curing at 350 is illustrated by the transition from FIG. 14, in which the composite material includes uncured composite material 184, to FIG. 15, in which the composite material includes cured composite material 186 and defines fixture body 20.

Disengaging the forming tools from the jack-screw-accepting threaded regions at 360 may include disengaging each forming tool of the plurality of forming tools from the corresponding jack-screw-accepting threaded region. The disengaging at 360 may be accomplished in any suitable manner. In some examples, the disengaging at 360 may include rotating the forming tools to disengage the forming tools from the jack-screw-accepting threaded regions. This may include rotating each forming tool, such as about a longitudinal axis thereof, to disengage each forming tool from a corresponding jack-screw-accepting threaded region, from a corresponding threaded insert, and/or from the frame. The disengaging at 360 may include rotating both the threaded tool end region and the hole-defining body of each forming tool relative to the fixture body and/or rotating the hole-defining body of each forming tool within a corresponding hole that is defined in the fixture body by the hole-defining body during, or as a result of, the filling at 340 and the curing at 350. The rotating may include engaging a tool, such as adjustment tool 200, a wrench, an impact wrench, a pneumatic wrench, and/or an electric wrench, with a forming tool engagement structure of the forming tool, examples of which are disclosed herein with reference to forming tool engagement structure 110 of FIG. 7.

In some examples, the disengaging at 360 further may include separating each forming tool from the fixture body.

This may include establishing a spaced-apart relationship between each forming tool and the fixture body. The separating additionally or alternatively may include completely removing the forming tools from holes that are defined within the fixture body by the hole-defining body of the forming tools, such as during the filling at 340 and the curing at 350. Additionally or alternatively, the separating may include operatively translating each forming tool along the longitudinal axis thereof and/or away from the fixture body.

When the plurality of jack-screw-accepting threaded regions is defined by the plurality of threaded inserts, the disengaging at 360 may include retaining the plurality of threaded inserts within, or operatively attached to, the fixture body. Similarly, when the plurality of jack-screw-accepting threaded regions is defined by the frame, the disengaging at 360 may include retaining the frame within, or operatively attached to, the fixture body.

Figure 16:
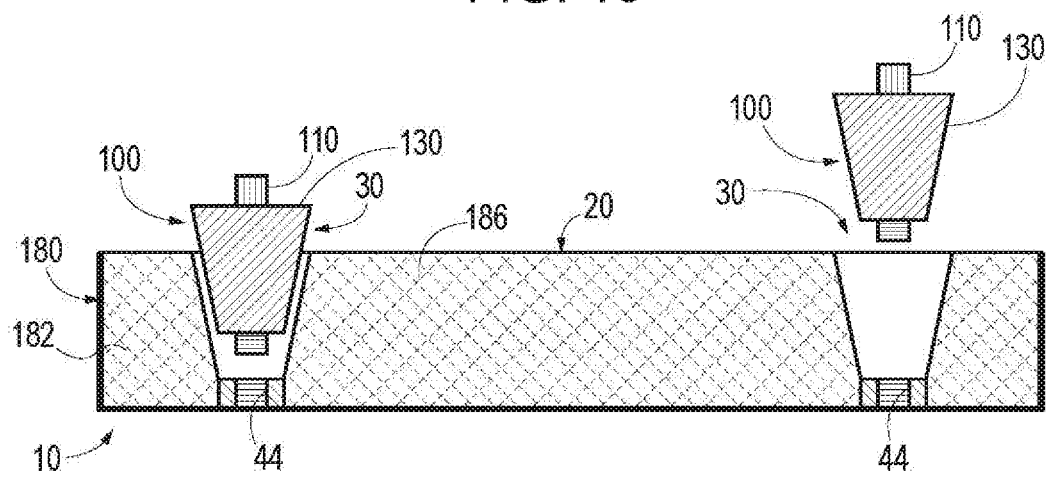
FIG. 16 is a schematic cross-sectional view illustrating an example of a portion of the methods of FIG. 9.

An example of the disengaging at 360 is illustrated in FIG. 16. As illustrated therein, the disengaging at 360 may include at least partially separating forming tools 100 from fixture body 20 and/or at least partially removing the forming tools from a corresponding plurality of spaced-apart holes 30 that are defined within the fixture body.

Figure 17:
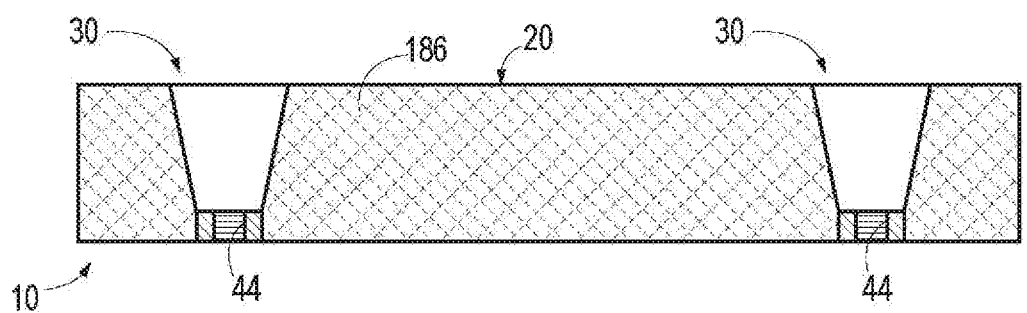
FIG. 17 is a schematic cross-sectional view illustrating an example of an adjustable fixture formed utilizing the methods of FIG. 9.
Figure 18:
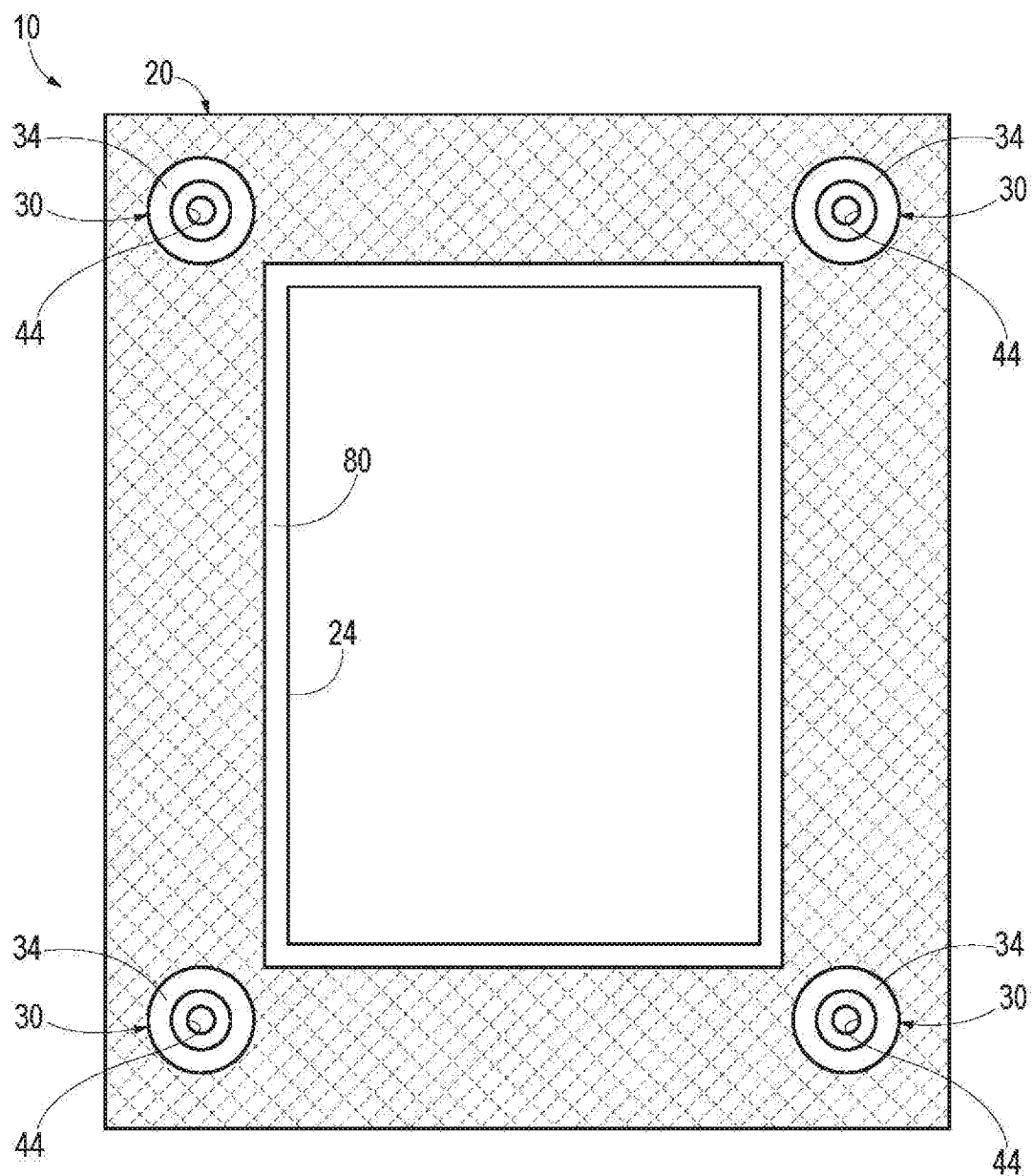
FIG. 18 is a schematic top view illustrating an example of an adjustable fixture formed utilizing the methods of FIG. 9.

Removing the fixture body from the mold at 370 may include establishing a spaced-apart relationship between the fixture body and the mold. As examples, the removing at 370 may include disassembling the mold and/or operatively translating the fixture body relative to the mold and in a direction that is normal to the exposed surface of the fixture body. The removing at 370 is illustrated by the transition from FIG. 16, in which fixture body 20 is contained within mold 180 and/or within fixture-defining cavity 182 thereof, to FIGS. 17-18, in which adjustable fixture 10 is spaced-apart from the mold and/or is not contained within the mold. FIG. 17 is a schematic cross-sectional view of adjustable fixture 10 formed utilizing methods 300, while FIG. 18 is a schematic top view of adjustable fixture 10.

Threading jack screws into the jack-screw-accepting threaded regions at 380 may include threading a corresponding jack screw into each jack-screw-accepting threaded region. This may include threading the jack screws into the plurality of threaded inserts and/or into the frame. The threading at 380 may be performed with, via, and/or utilizing an adjustment tool, such as adjustment tool 200 of FIG. 8, which is disclosed herein.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of adjustable fixtures, forming tools, adjustment tools, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. An adjustable fixture for a buried tubular, the fixture comprising:
  a fixture body having an upper surface, a lower surface, and a central opening, or an opening, that extends between the upper surface and the lower surface and is sized to provide access to a buried tubular conduit defined by the buried tubular;
  a plurality of spaced-apart holes extending between the upper surface of the fixture body and the lower surface of the fixture body; and
  a plurality of jack-screw-accepting threaded regions, wherein each hole of the plurality of spaced-apart holes is at least partially defined by a corresponding jack-screw-accepting threaded region of the plurality of jack-screw-accepting threaded regions.

A2. The fixture of paragraph A1, wherein the fixture further includes at least one jack screw, wherein the at least one jack screw is threaded within a selected jack-screw-accepting threaded region of the plurality of jack-screw-accepting threaded regions, optionally wherein the at least one jack screw includes a plurality of jack screws, wherein a corresponding jack screw of the plurality of jack screws is threaded within each jack-screw-accepting threaded region of the plurality of jack-screw-accepting threaded regions.

A3. The fixture of paragraph A2, wherein the at least one jack screw includes:
  (i) a jack screw drive end shaped to operatively interlock with an adjustment tool;
  (ii) a jack screw load-bearing end shaped to contact an underlying structure, which supports the fixture; and
  (iii) a threaded jack screw shaft that extends between the jack screw drive end and the jack screw load-bearing end.

A4. The fixture of paragraph A3, wherein the jack screw drive end includes at least one of:
  (i) a square head; and
  (ii) a hex head.

A5. The fixture of any of paragraphs A3-A4, wherein the jack screw load-bearing end has at least one of:
  (i) a conic shape;
  (ii) an at least partially conic shape;
  (iii) a blunted conic shape; and
  (iv) a spherically blunted conic shape.

A6. The fixture of any of paragraphs A3-A5, wherein a length of the threaded jack screw shaft is greater than a length of the selected jack-screw-accepting threaded region.

A7. The fixture of any of paragraphs A1-A6, wherein the fixture defines an annular space extending between the at least one jack screw and a selected hole of the plurality of spaced-apart holes that is at least partially defined by the selected jack-screw-accepting threaded region.

A8. The fixture of paragraph A7, wherein a resilient material in the annular space at least one of:
  (i) extends within the annular space;
  (ii) at least partially fills the annular space;
  (iii) fills the annular space;
  (iv) completely fills the annular space; and
  (v) restricts entry of particulate material into the annular space via an opening into the annular space that is defined on the upper surface of the fixture body.

A9. The fixture of any of paragraphs A7-A8, wherein the resilient material includes at least one of a foam and a compressible foam.

A10. The fixture of any of paragraphs A1-A9, wherein the fixture further includes at least one threaded plug, wherein the at least one threaded plug is threaded within the selected jack-screw-accepting threaded region of the plurality of jack-screw-accepting threaded regions, optionally wherein the at least one threaded plug includes a plurality of threaded plugs, wherein a corresponding threaded plug of the plurality of threaded plugs is threaded within each jack-screw-accepting threaded region of the plurality of jack-screw-accepting threaded regions.

A11. The fixture of paragraph A10, wherein the at least one threaded plug includes:
  (i) a plug drive end shaped to operatively interlock with a/the adjustment tool; and
  (ii) a threaded plug shaft.

A12. The fixture of paragraph A11, wherein the plug drive end is slotted.

A13. The fixture of any of paragraphs A11-A12, wherein a length of the threaded plug shaft is less than a/the length of the selected jack-screw-accepting threaded region.

A14. The fixture of any of paragraphs A1-A13, wherein the fixture further includes at least one cap positioned within a selected hole of the plurality of spaced-apart holes and configured to restrict entry of foreign material into the selected hole via a region of the selected hole that is proximal the upper surface of the fixture body, optionally wherein the at least one cap includes a plurality of caps, wherein a corresponding cap of the plurality of caps is positioned within each hole of the plurality of spaced-apart holes.

A15. The fixture of paragraph A14, wherein the at least one cap is sized for a friction fit with the selected hole.

A16. The fixture of any of paragraphs A14-A15, wherein the selected hole includes a cap-accepting threaded region that is spaced apart from a corresponding jack-screw-accepting threaded region that at least partially defines the selected hole, wherein the at least one cap includes a cap threaded region, and further wherein the at least one cap is threaded into the cap-accepting threaded region.

A17. The fixture of paragraph A16, wherein a cap thread pitch of the cap-accepting threaded region is equal, or at least substantially equal, to a jack screw thread pitch of the corresponding jack-screw-accepting threaded region.

A18. The fixture of any of paragraphs A1-A17, wherein the plurality of jack-screw-accepting threaded regions is defined by the fixture body.

A19. The fixture of any of paragraphs A1-A18, wherein the plurality of jack-screw-accepting threaded regions is defined by a plurality of threaded inserts that extends at least partially within the fixture body.

A20. The fixture of paragraph A19, wherein each threaded insert of the plurality of threaded inserts includes a female threaded region that defines the corresponding jack-screw-accepting threaded region of the plurality of jack-screw-accepting threaded regions.

A21. The fixture of any of paragraphs A19-A20, wherein each threaded insert of the plurality of threaded inserts includes an anti-rotation feature shaped to resist rotation of each threaded insert relative to the fixture body.

A22. The fixture of paragraph A21, wherein the anti-rotation feature defines a non-circular cross-sectional shape as measured in a plane that is perpendicular to a thread axis of the corresponding jack-screw-accepting threaded region.

A23. The fixture of any of paragraphs A21-A22, wherein the anti-rotation feature is not rotationally symmetric about a/the thread axis of a/the corresponding jack-screw-accepting threaded region.

A24. The fixture of any of paragraphs A21-A23, wherein each threaded insert of the plurality of threaded inserts includes a projecting flange shaped to resist separation of the plurality of threaded inserts from the fixture body.

A25. The fixture of paragraph A24, wherein each threaded insert of the plurality of threaded inserts includes an upper surface and an opposed lower surface, and further the projecting flange at least partially defines the upper surface.

A26. The fixture of paragraph A25, wherein the projecting flange is a first projecting flange, and further wherein each threaded insert of the plurality of threaded inserts includes a second projecting flange that at least partially defines the lower surface.

A27. The fixture of any of paragraphs A21-A26, wherein the plurality of threaded inserts includes a plurality of flange nuts.

A27.1. The fixture of any of paragraphs A19-A27, wherein the fixture further includes a frame, whereof the plurality of threaded inserts is operatively attached to the frame, and further wherein the fixture body is molded around at least a portion of the frame.

A27.2. The fixture of any of paragraphs A1-A27, wherein the plurality of jack-screw-accepting threaded regions is defined by a frame, wherein the fixture body is molded around at least a portion of the frame.

A28. The fixture of any of paragraphs A1-A27, wherein the plurality of jack-screw-accepting threaded regions defines at least one of a female thread, a female acme thread, and a female coil thread.

A29. The fixture of any of paragraphs A1-A28, wherein an outer perimeter of the fixture body, as measured within a plane that is parallel to the upper surface, is at least one of:
(i) circular;
(ii) at least substantially circular;
(iii) square;
(iv) at least substantially square;
(v) rectangular; and
(vi) at least substantially rectangular.

A30. The fixture of any of paragraphs A1-A29, wherein an outer perimeter of the central opening, as measured in a/the plane that is parallel to the upper surface, is at least one of:
(i) circular;
(ii) at least substantially circular;
(iii) square;
(iv) at least substantially square;
(v) rectangular; and
(vi) at least substantially rectangular.

A31. The fixture of any of paragraphs A1-A30, wherein the fixture body defines a body thickness, or an average body thickness, optionally wherein the body thickness is measured between the upper surface and the lower surface, and further optionally wherein the body thickness is at least one of:
(i) at least 2.5 centimeters (cm), at least 5 cm, at least 7.5 cm, at least 10 cm, at least 12.5 cm, at least 15 cm, at least 17.5 cm, or at least 20 cm; and
(ii) at most 30 cm, at most 25 cm, at most 20 cm, and at most 17.5 cm.

A32. The fixture of paragraph A31, wherein a ratio of a maximum extent of the fixture body to the body thickness is at least one of:
(i) at least 2, at least 4, at least 6, at least 8, at least 10, at least 12, at least 14, at least 16, at least 18, or at least 20; and
(ii) at most 25, at most 20, at most 17.5, at most 15, at most 12.5, at most 10, at most 7.5, or at most 5.

A33. The fixture of any of paragraphs A1-A32, wherein a ratio of a/the maximum extent of the fixture body to a maximum extent of the central opening is at least one of:
(i) at least 1.05, at least 1.1, at least 1.15, at least 1.2, at least 1.25, or at least 1.3; and
(ii) at most 2, at most 1.9, at most 1.8, at most 1.7, at most 1.6, at most 1.5, at most 1.4, at most 1.3, or at most 1.2.

A34. The fixture of any of paragraphs A1-A33, wherein the fixture body is defined by a body material, optionally wherein the body material at least one of:
(i) includes a metal;
(ii) is a metal;
(iii) includes steel;
(iv) is steel;
(v) includes cast iron;
(vi) is cast iron;
(vii) includes a composite material;
(viii) is a composite material;
(ix) includes concrete;
(x) is concrete;
(xi) includes reinforced concrete; and
(xii) is reinforced concrete.

A35. The fixture of any of paragraphs A1-A34, wherein the upper surface of the fixture body at least partially defines a support structure shaped to support a cover.

A36. The fixture of paragraph A35, wherein the support structure defines an at least partially restricted region within the central opening.

A37. The fixture of any of paragraphs A35-A36, wherein the fixture further includes the cover, optionally wherein the cover includes at least one of a storm grate cover, a water-permeable cover, a manhole cover, an access cover, and a water-impermeable cover.

A38. The fixture of any of paragraphs A1-A37, wherein the fixture includes, and optionally is, at least one of:
(i) a manhole cover frame;
(ii) a storm grate frame;
(iii) a riser ring;
(iv) a combo inlet;
(v) an access cover frame;
(vi) a utility vault lid frame;
(vii) a vent grate frame; and
(viii) a grating.

A39. The fixture of any of paragraphs A1-A38, wherein each hole of the plurality of spaced-apart holes defines a tapered hole region, or a female tapered hole region, that extends at least partially between the upper surface and the corresponding jack-screw-accepting threaded region of the plurality of jack-screw-accepting threaded regions.

A40. The fixture of paragraph A39, wherein the tapered hole region tapers toward the corresponding jack-screw-accepting threaded region.

A41. The fixture of any of paragraphs A39-A40, wherein the tapered hole region is at least partially conic.

A42. The fixture of any of paragraphs A1-A41, wherein each hole of the plurality of spaced-apart holes defines a cylindrical hole region that extends from the upper surface.

A43. The fixture of paragraph A42, wherein the cylindrical hole region extends to a/the tapered hole region.

A44. The fixture of paragraph A43, wherein each hole of the plurality of spaced-apart holes further includes a transition hole region between the cylindrical hole region and the tapered hole region, optionally wherein the transition hole region includes at least one of a rounded hole edge and a chamfered hole edge.

A45. The fixture of any of paragraphs A42-A44, wherein the cylindrical hole region includes a/the cap-accepting threaded region, and the tapered hole region includes the cap-accepting threaded region.

A46. The fixture of any of paragraphs A1-A45, whereof the plurality of jack-screw-accepting threaded regions is defined by a/the plurality of threaded inserts, wherein the plurality of spaced-apart holes is sized for an interference fit with the plurality of threaded inserts.

A47. The fixture of any of paragraphs A1-A46, wherein the fixture further includes a plurality of eye bolts, wherein each eye bolt of the plurality of eye bolts includes an eye region and a threaded eye bolt shaft that extends from the eye region and is threaded into a corresponding jack-screw-accepting threaded region of the plurality of jack-screw-accepting threaded regions such that the eye region extends above the upper surface of the fixture body.

A48. The fixture of any of paragraphs A1-A47 in combination with the forming tool of any of paragraphs B1-B26, wherein the forming tool is positioned within a corresponding hole of the plurality of spaced-apart holes, and further wherein a threaded tool end region is threaded into a corresponding jack-screw-accepting threaded region that at least partially defines the corresponding spaced-apart hole.

A49. The fixture of paragraph A48, wherein a hole-defining body is in direct physical contact with a region, or an entirety of a region, of the corresponding hole that extends between the upper surface and the corresponding jack-screw-accepting threaded region.

A50. The fixture of any of paragraphs A1-A49 in combination with the adjustment tool of any of paragraphs C1-C6, wherein the at least one jack screw is threaded within a/the selected jack-screw-accepting region of the plurality of jack-screw-accepting regions, and further wherein a socket drive end of the adjustment tool is operatively engaged with a/the jack screw drive end of the at least one jack screw, optionally to facilitate rotation of the at least one jack screw.

B1. A forming tool for defining a hole in an adjustable fixture for a buried tubular, the forming tool comprising:
 a forming tool engagement structure;
 a threaded tool end region extending away from the forming tool engagement structure; and
 a hole-defining body extending at least partially between the forming tool engagement structure and the threaded tool end region.

B2. The forming tool of paragraph B 1, wherein the forming tool engagement structure is operatively attached to the hole-defining body.

B3. The forming tool of any of paragraphs B1-B2, wherein the forming tool further includes a tool shaft that extends from the forming tool engagement structure, optionally wherein the hole-defining body is operatively attached to the tool shaft, and further optionally wherein the threaded tool end region is defined by the tool shaft.

B4. The forming tool of paragraph B3, wherein the hole-defining body defines a central hole, and further wherein the tool shaft extends through the central hole.

B5. The forming tool of any of paragraphs B3-B4, wherein the hole-defining body includes a body retention structure that retains the hole-defining body on the tool shaft.

B6. The forming tool of any of paragraphs B1-B5, wherein the forming tool engagement structure is configured to separably engage with a remainder of the forming tool.

B7. The forming tool of any of paragraphs B1-B6, wherein the forming tool engagement structure includes a forming tool T-handle.

B8. The forming tool of any of paragraphs B1-B7, wherein the threaded tool end region defines a male thread.

B9. The forming tool of any of paragraphs B1-B8, wherein the threaded tool end region defines at least one of an acme thread and a coil thread.

B10. The forming tool of any of paragraphs B1-B9, wherein the threaded tool end region extends from the hole-defining body and an end region thread length, optionally wherein the adjustable fixture includes a jack-screw-accepting threaded region that defines a jack-screw-accepting thread length, optionally wherein the threaded tool end region is shaped to thread into the jack-screw-accepting threaded region, and further optionally wherein the end region thread length is less than the jack-screw-accepting thread length.

B11. The forming tool of any of paragraphs B1-B10, wherein the threaded tool end region defines a thread axis, and further wherein the hole-defining body is rotationally symmetric, or at least substantially rotationally symmetric, about the thread axis.

B12. The forming tool of any of paragraphs B1-B11, wherein the hole-defining body defines a tapered body region, or a male tapered body region, that extends at least partially between the forming tool engagement structure and the threaded tool end region.

B13. The forming tool of paragraph B12, wherein the tapered body region tapers toward the threaded tool end region.

B14. The forming tool of any of paragraphs B12-B13, wherein the tapered body region is at least partially conic.

B15. The forming tool of any of paragraphs B1-B14, wherein the hole-defining body defines a cylindrical body region, or a male cylindrical body region, that extends from a forming-tool-engagement-structure-proximal end of the hole-defining body.

B16. The forming tool of paragraph B15, wherein the cylindrical body region extends to a/the tapered body region.

B17. The forming tool of paragraph B16, wherein the hole-defining body further includes a transition body region between the cylindrical body region and the tapered body region, optionally wherein the transition body region includes at least one of a rounded body edge and a chamfered body edge.

B18. The forming tool of any of paragraphs B15-B17, wherein the cylindrical body region includes a cap-accepting thread defining region, optionally wherein a cap thread pitch of the cap-accepting thread defining region is equal, or at least substantially equal, to a jack screw thread pitch of a/the jack-screw-accepting threaded region of the adjustable fixture.

B19. The forming tool of any of paragraphs B1-B18, wherein the hole-defining body is defined by at least one of a resilient body, a polymeric body, and an ultra-high molecular weight polyethylene body.

B20. The forming tool of any of paragraphs B1-B19, wherein the hole-defining body is an inflatable hole-defining body.

B21. The forming tool of any of paragraphs B1-B20, wherein the hole-defining body defines a hole-defining body length, as measured along a longitudinal axis of the hole-defining body, wherein the hole-defining body length is at least one of:

(i) at least 2.5 centimeters (cm), at least 5 cm, at least 7.5 cm, at least 10 cm, at least 12.5 cm, at least 15 cm, at least 17.5 cm, or at least 20 cm; and (ii) at most 30 cm, at most 25 cm, at most 20 cm, or at most 17.5 cm.

B22. The forming tool of any of paragraphs B1-B21, wherein the forming tool further includes a sealing structure on a threaded-tool-end-region-proximal end of the hole-defining body.

B23. The forming tool of paragraph B22, wherein the sealing structure is defined by the hole-defining body, optionally wherein the hole-defining body is a resilient hole-defining body configured to define the sealing structure.

B24. The forming tool of any of paragraphs B22-B23, wherein the sealing structure is operatively attached to at least one of the hole-defining body and the threaded tool end region.

B25. The forming tool of paragraph B24, wherein the sealing structure includes at least one of an o-ring and a gasket.

B26. The forming tool of any of paragraphs B24-B25, wherein the sealing structure is configured to form an at least partial fluid seal with the adjustable fixture.

C1. An adjustment tool for adjusting an adjustable fixture for a buried tubular, the adjustment tool comprising:

a socket drive end defining a socket drive axis;

a slotted drive end defining a slotted drive axis; and an adjustment tool handle region extending at least partially between the socket drive end and the slotted drive end, wherein the adjustment tool handle region is shaped to facilitate rotation of the socket drive end about the socket drive axis, and further wherein the adjustment tool handle region is shaped to facilitate rotation of the slotted drive end about the slotted drive axis.

C2. The adjustment tool of paragraph C1, wherein the socket drive end is a first socket drive end, wherein the socket drive axis is a first socket drive axis, wherein the adjustment tool further includes a second socket drive end defining a second socket drive axis, and further wherein the adjustment tool handle region is shaped to facilitate rotation of the second socket drive end about the second socket drive axis.

C3. The adjustment tool of paragraph C2, wherein the adjustment tool is T-shaped.

C4. The adjustment tool of paragraph C3, wherein the first socket drive axis and the second socket drive axis are at least one of parallel and coextensive.

C5. The adjustment tool of any of paragraphs C3-C4, wherein the slotted drive axis is perpendicular to at least one, and optionally both, the first socket drive axis and the second socket drive axis.

C6. The adjustment tool of any of paragraphs C2-C5, wherein the first socket drive end is a square first socket drive end that has a first size, wherein the second socket drive end is a square second socket drive end that has a second size, and further wherein the first size differs from the second size.

D1. A method of manufacturing an adjustable fixture for a buried tubular, the method comprising:

positioning, within a mold for the adjustable fixture, a plurality of jack-screw-accepting threaded regions;

positioning, within the mold for the adjustable fixture, a plurality of forming tools such that a corresponding forming tool of the plurality of forming tools extends from each jack-screw-accepting threaded region of the plurality of jack-screw-accepting threaded regions;

filling a fixture-defining cavity of the mold with a composite material, wherein the filling includes partially encapsulating a hole-defining body of each forming tool of the plurality of forming tools with the composite material;

curing the composite material to define a fixture body of the adjustable fixture;

disengaging each forming tool of the plurality of forming tools from a corresponding jack-screw-accepting threaded region; and removing the fixture body from the mold.

D2. The method of paragraph D1, wherein the positioning the plurality of jack-screw-accepting threaded regions and the positioning the plurality of forming tools are performed prior to the filling.

D3. The method of any of paragraphs D1-D2, wherein the plurality of jack-screw-accepting threaded regions is defined by a plurality of threaded inserts, and further wherein the positioning the plurality of jack-screw-accepting threaded regions includes positioning the plurality of threaded inserts within the mold.

D4. The method of paragraph D3, wherein the disengaging includes retaining the plurality of threaded inserts within the fixture body.

D5. The method of any of paragraphs D3-D4, wherein the positioning the plurality of jack-screw-accepting threaded regions includes at least partially sequentially positioning the plurality of threaded inserts within the mold.

D6. The method of any of paragraphs D3-D5, wherein the method includes at least substantially simultaneously performing the positioning of a given jack-screw-accepting threaded region of the plurality of jack-screw-accepting threaded regions and the positioning the corresponding forming tool.

D7. The method of any of paragraphs D3-D6, wherein the mold for the adjustable fixture includes a plurality of retention threaded regions, and further wherein the method includes threading a threaded tool end region of the corresponding forming tool into a corresponding retention threaded region of the plurality of retention threaded regions, optionally such that a threaded insert extends between a corresponding hole-defining body of the corresponding forming tool and the mold.

D8. The method of any of paragraphs D3-D7, wherein the mold includes a plurality of locator studs, and further wherein the positioning the plurality of jack-screw-accepting threaded regions includes positioning the threaded insert of the plurality of threaded inserts on each locator stud of the plurality of locator studs.

D9. The method of paragraph D8, wherein the positioning the plurality of jack-screw-accepting threaded regions includes magnetically retaining the threaded insert on each locator stud.

D10. The method of any of paragraphs D8-D9, wherein the positioning the plurality of jack-screw-accepting threaded regions includes extending each locator stud at least partially within a corresponding jack-screw-accepting threaded region of each threaded insert.

D11. The method of any of paragraphs D1-D10, wherein the plurality of jack-screw-accepting threaded regions is defined by a frame, and further wherein the positioning the plurality of jack-screw-accepting threaded regions includes positioning the frame within the mold.

D12. The method of paragraphs D11, wherein the positioning the plurality of jack-screw-accepting threaded regions includes at least substantially simultaneously positioning the frame within the mold.

D13. The method of any of paragraphs D11-D12, wherein the disengaging includes retaining the frame within the fixture body.

D14. The method of any of paragraphs D11-D13, wherein the positioning the frame within the mold includes magnetically retaining the frame at a predetermined location within the mold.

D15. The method of any of paragraphs D1-D14, wherein the method further includes threading a/the threaded tool end region of the corresponding forming tool into each jack-screw-accepting threaded region.

D16. The method of paragraph D15, wherein the threading the threaded tool end region into each jack-screw-accepting threaded region is prior to the positioning the plurality of jack-screw-accepting threaded regions and prior to the positioning the plurality of forming tools.

D17. The method of paragraph D15, wherein the threading the threaded tool end region into each jack-screw-accepting threaded region is subsequent to the positioning the plurality of jack-screw-accepting threaded regions and at least partially concurrently with the positioning the plurality of forming tools.

D18. The method of any of paragraphs D15-D17, wherein the threading includes at least one of rotating the threaded tool end region of the corresponding forming tool relative to each jack-screw-accepting threaded region and rotating each jack-screw-accepting threaded region relative to the threaded tool end region of the corresponding forming tool.

D19. The method of any of paragraphs D15-D18, wherein the threading includes operatively interlocking the corresponding forming tool within each jack-screw-accepting threaded region.

D20. The method of any of paragraphs D15-D19, wherein the threading includes establishing an at least partial fluid seal between the corresponding forming tool and a thread-defining body that defines a corresponding jack-screw-accepting threaded region, optionally to resist flow of the composite material into the corresponding jack-screw-accepting threaded region.

D21. The method of paragraph D20, wherein the establishing includes at least one of:
(i) establishing the at least partial fluid seal between the hole-defining body of the corresponding forming tool and the thread-defining body; and
(ii) establishing the at least partial fluid seal with a sealing structure that extends at least partially between the hole-defining body of the corresponding forming tool and the thread-defining body.

D22. The method of any of paragraphs D1-D21, wherein the filling includes flowing the composite material, or an uncured composite material, into the fixture-defining cavity.

D23. The method of any of paragraphs D1-D22, wherein the filling includes defining an exposed surface of the composite material, and further wherein, subsequent to the filling, the method includes finishing the exposed surface of the composite material.

D24. The method of any of paragraphs D1-D23, wherein the composite material includes, and optionally is, uncured concrete.

D25. The method of any of paragraphs D1-D24, wherein the curing includes waiting a threshold cure time prior to performing the disengaging and the removing.

D26. The method of paragraph D25, wherein the threshold cure time is at least 10 minutes, at least 20 minutes, at least 30 minutes, at least 40 minutes, at least 50 minutes, at least 1 hour, at least 2 hours, at least 3 hours, at least 4 hours, or at least 5 hours.

D27. The method of any of paragraphs D1-D26, wherein the disengaging includes rotating each forming tool of the plurality of forming tools to disengage each forming tool from a corresponding jack-screw-accepting threaded region of the plurality of jack-screw-accepting threaded regions.

D28. The method of paragraph D27, wherein the rotating includes rotating both the threaded tool end region and the hole-defining body of each forming tool relative to the fixture body.

D29. The method of any of paragraphs D27-D28, wherein the rotating includes rotating the hole-defining body of each forming tool within a hole that is defined in the fixture body by the hole-defining body during the filling and the curing.

D30. The method of any of paragraphs D27-D29, wherein the rotating includes rotating each forming tool about a longitudinal axis thereof.

D31. The method of any of paragraphs D1-D30, wherein the method further includes separating each forming tool from the fixture body while retaining the corresponding jack-screw-accepting threaded region within the fixture body.

D32. The method of paragraph D31, wherein the separating is subsequent to the disengaging.

D33. The method of any of paragraphs D31-D32, wherein the separating includes completely removing the forming tool from a/the hole that is defined in the fixture body by the hole-defining body during the filling and the curing.

D34. The method of any of paragraphs D31-D33, wherein the separating includes operatively translating each forming tool along a/the longitudinal axis thereof.

D35. The method of any of paragraphs D1-D34, wherein the removing includes establishing a spaced-apart relationship between the mold and the fixture body.

D36. The method of any of paragraphs D1-D35, wherein the removing includes at least one of:
(i) disassembling the mold; and
(ii) operatively translating the fixture body relative to the mold and in a direction that is normal to an/the exposed surface of the fixture body.

D37. The method of any of paragraphs D1-D36, wherein, subsequent to the disengaging, the method further includes threading a corresponding jack screw into each jack-screw-accepting threaded region.

D38. The method of paragraph D37, wherein the threading the corresponding jack screw includes utilizing the adjustment tool of any of paragraphs C1-C6.

D39. The method of any of paragraphs D1-D37, wherein the adjustable fixture includes any suitable structure of any of the adjustable fixtures of any of paragraphs A1-A50.

D40. The method of any of paragraphs D1-D37, wherein the forming tool includes any suitable structure of any of the forming tools of any of paragraphs B1-B26.

D41. The method of any of paragraphs D1-D37, wherein the mold is shaped to define any suitable surface contour of any of the fixture bodies described in any of paragraphs A1-A50.

INDUSTRIAL APPLICABILITY

The fixtures, forming tools, adjustment tools, and methods disclosed herein are applicable to the construction and roadway/greenway appurtenances industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of manufacturing an adjustable fixture for a buried tubular, the method comprising:
   positioning, within a mold for the adjustable fixture, a plurality of jack-screw-accepting threaded regions;
   positioning, within the mold for the adjustable fixture, a plurality of forming tools such that a corresponding forming tool of the plurality of forming tools extends from each jack-screw-accepting threaded region of the plurality of jack-screw-accepting threaded regions;
   filling a fixture-defining cavity of the mold with a composite material, wherein the filling includes partially encapsulating a hole-defining body of each forming tool of the plurality of forming tools with the composite material;
   curing the composite material to define a fixture body of the adjustable fixture, wherein the fixture body defines an upper surface and a lower surface;
   disengaging each forming tool of the plurality of forming tools from a corresponding jack-screw-accepting threaded region and removing each forming tool from a corresponding hole defined within the fixture body, wherein, subsequent to the disengaging, the corresponding hole extends completely between the upper surface and the lower surface; and
   removing the fixture body from the mold.

2. The method of claim 1, wherein the plurality of jack-screw-accepting threaded regions is defined by a plurality of threaded inserts, and further wherein the positioning the plurality of jack-screw-accepting threaded regions includes positioning the plurality of threaded inserts within the mold.

3. The method of claim 2, wherein the disengaging includes retaining the plurality of threaded inserts within the fixture body.

4. The method of claim 2, wherein the method includes at least substantially simultaneously performing the positioning of a given jack-screw-accepting threaded region of the plurality of jack-screw-accepting threaded regions and the positioning the corresponding forming tool.

5. The method of claim 2, wherein the mold for the adjustable fixture includes a plurality of retention threaded regions, and further wherein the method includes threading a threaded tool end region of the corresponding forming tool into a corresponding retention threaded region of the plurality of retention threaded regions, such that a threaded insert extends between a corresponding hole-defining body of the corresponding forming tool and the mold.

6. The method of claim 2, wherein the mold includes a plurality of locator studs, and further wherein the positioning the plurality of jack-screw-accepting threaded regions includes positioning the threaded insert of the plurality of threaded inserts on each locator stud of the plurality of locator studs.

7. The method of claim 1, wherein the plurality of jack-screw-accepting threaded regions includes at least three jack-screw-accepting threaded regions defined by a frame, and further wherein the positioning the plurality of jack-screw-accepting threaded regions includes positioning the frame within the mold.

8. The method of claim 7, wherein the disengaging includes retaining the frame within the fixture body.

9. The method of claim 1, wherein the method further includes threading the corresponding threaded tool end region of the corresponding forming tool into each jack-screw-accepting threaded region.

10. The method of claim 9, wherein the threading the corresponding threaded tool end region into each jack-screw-accepting threaded region is prior to the positioning the plurality of jack-screw-accepting threaded regions and prior to the positioning the plurality of forming tools.

11. The method of claim 9, wherein the threading the corresponding threaded tool end region into each jack-screw-accepting threaded region is subsequent to the positioning the plurality of jack-screw-accepting threaded regions and at least partially concurrently with the positioning the plurality of forming tools.

12. The method of claim 1, wherein the filling includes flowing the composite material into the fixture-defining cavity.

13. The method of claim 1, wherein the disengaging includes rotating each forming tool of the plurality of forming tools to disengage each forming tool from a corresponding jack-screw-accepting threaded region of the plurality of jack-screw-accepting threaded regions.

14. The method of claim 13, wherein the rotating includes rotating both the threaded tool end region and the hole-defining body of each forming tool relative to the fixture body.

15. The method of claim 1, wherein the method further includes separating each forming tool from the fixture body while retaining the corresponding jack-screw-accepting threaded region within the fixture body.

16. The method of claim 15, wherein the separating includes completely removing each forming tool from a corresponding hole that is defined in the fixture body by the hole-defining body during the filling and the curing.

17. The method of claim 1, wherein, subsequent to the disengaging, the method further includes threading a corresponding jack screw into each jack-screw-accepting threaded region such that the corresponding jack screw projects from the lower surface of the fixture body.

18. An adjustable fixture for a buried tubular, the fixture comprising:
- a fixture body having an upper surface, a lower surface, and a central opening that extends between the upper surface and the lower surface and is sized to provide access to a buried tubular conduit defined by the buried tubular;
- a plurality of spaced-apart holes extending between the upper surface of the fixture body and the lower surface of the fixture body; and
- a plurality of jack-screw-accepting threaded regions, wherein each hole of the plurality of spaced-apart holes is at least partially defined by a corresponding jack-screw-accepting threaded region of the plurality of jack-screw-accepting threaded regions;
- wherein each hole of the plurality of spaced-apart holes defines a tapered hole region that extends at least partially between the upper surface and the corresponding jack-screw-accepting threaded region of the plurality of jack-screw-accepting threaded regions.

19. The fixture of claim 18, wherein the fixture further includes a plurality of jack screws, wherein a corresponding jack screw of the plurality of jack screws is threaded within each jack-screw-accepting threaded region of the plurality of jack-screw-accepting threaded regions.

20. The fixture of claim 18, wherein the plurality of jack-screw-accepting threaded regions is defined by a plurality of threaded inserts that extends at least partially within the fixture body.

21. The adjustable fixture of claim 20, wherein the plurality of threaded inserts at least partially defines the lower surface of the fixture body.

22. The fixture of claim 18, wherein the plurality of jack-screw-accepting threaded regions includes at least three jack-screw-accepting threaded regions defined by a frame, wherein the fixture body is molded around at least a portion of the frame.

23. The adjustable fixture of claim 18, wherein each hole of the plurality of spaced-apart holes:
- extends from the upper surface of the fixture body; and
- (ii) extends from the lower surface of the fixture body.

* * * * *

UNITED STATES PATENT AND TRADEMARK OFFICE
CERTIFICATE OF CORRECTION

PATENT NO. : 11,365,537 B2
APPLICATION NO. : 16/795292
DATED : June 21, 2022
INVENTOR(S) : Aaron Barr It is certified that error appears in the above-identified patent and that said Letters Patent is hereby corrected as shown below:

In the Claims

Claim 23, Column 32, Line 19, please insert "(i)" before "extends from the upper surface of the fixture body; and…"

Signed and Sealed this
Eleventh Day of July, 2023

Katherine Kelly Vidal
*Director of the United States Patent and Trademark Office*